(12) United States Patent
Yan et al.

(10) Patent No.: US 10,892,868 B2
(45) Date of Patent: Jan. 12, 2021

(54) DATA TRANSMISSION METHOD AND APPARATUS

(71) Applicant: HUAWEI TECHNOLOGIES CO., LTD., Guangdong (CN)

(72) Inventors: Zhiyu Yan, Shenzhen (CN); Lei Guan, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/448,265

(22) Filed: Jun. 21, 2019

(65) Prior Publication Data
US 2019/0312702 A1 Oct. 10, 2019

Related U.S. Application Data

(63) Continuation of application No. PCT/CN2018/071781, filed on Jan. 8, 2018.

(30) Foreign Application Priority Data

Jan. 6, 2017 (CN) .......................... 2017 1 0011451

(51) Int. Cl.
*H04L 5/00* (2006.01)
*H04W 76/27* (2018.01)
(Continued)

(52) U.S. Cl.
CPC ............ *H04L 5/0048* (2013.01); *H04L 5/001* (2013.01); *H04L 5/005* (2013.01); *H04L 5/0044* (2013.01);
(Continued)

(58) Field of Classification Search
None
See application file for complete search history.

(56) References Cited

U.S. PATENT DOCUMENTS

2002/0052959 A1 5/2002 Freitas et al.
2015/0189574 A1* 7/2015 Ng .................. H04W 24/08
370/252

(Continued)

FOREIGN PATENT DOCUMENTS

CN 102378183 A 3/2012
CN 104661309 A 5/2015
(Continued)

OTHER PUBLICATIONS

NTT Docomo,"New SID Proposal: Study on New Radio Access Technology",3GPP TSG RAN Meeting #71 RP-160671,Göteborg, Sweden, Mar. 7-10, 2016, total 8 pages.
(Continued)

*Primary Examiner* — Brian S Roberts
(74) *Attorney, Agent, or Firm* — Womble Bond Dickinson (US) LLP

(57) ABSTRACT

This application provides a data transmission method and an apparatus, in which two radio access network devices share a resource. A first radio access network device determines a resource occupation status corresponding to a different status of a second access network device on a shared resource. The first radio access network device indicates the resource occupation status to a terminal device served by the first radio access network device. The terminal device determines an available resource in a shared carrier based on the resource occupation status, and communicates with the first access network device using the available resource. The first radio access network device can perform communication on the shared resource regardless of a status of the second radio access network device on the shared resource, so that the two radio access network devices flexibly and efficiently coexist in the shared carrier. This improves utilization of the shared resource.

20 Claims, 8 Drawing Sheets

(51) Int. Cl.
*H04W 4/06* (2009.01)
*H04W 56/00* (2009.01)
*H04W 72/04* (2009.01)
*H04W 16/14* (2009.01)
*H04W 72/00* (2009.01)

(52) U.S. Cl.
CPC .......... *H04L 5/0053* (2013.01); *H04L 5/0094* (2013.01); *H04W 4/06* (2013.01); *H04W 16/14* (2013.01); *H04W 56/001* (2013.01); *H04W 72/005* (2013.01); *H04W 72/0413* (2013.01); *H04W 76/27* (2018.02)

(56) References Cited

U.S. PATENT DOCUMENTS

| | | | |
|---|---|---|---|
| 2016/0127098 A1* | 5/2016 | Ng | H04L 5/0048 370/329 |
| 2016/0308648 A1 | 10/2016 | Li et al. | |
| 2018/0062806 A1* | 3/2018 | Jung | H04J 11/0069 |
| 2018/0184317 A1* | 6/2018 | Li | H04W 24/10 |
| 2018/0227838 A1* | 8/2018 | Hayashi | H04W 72/042 |

FOREIGN PATENT DOCUMENTS

| | | |
|---|---|---|
| CN | 105282858 A | 1/2016 |
| CN | 105848165 A | 8/2016 |
| CN | 106304271 A | 1/2017 |
| EP | 2611245 A1 | 7/2013 |

OTHER PUBLICATIONS

R1-1611681 Huawei et al:"Coexistence between NR and LTE", 3GPP TSG RAN WGl Meeting #87, Nov. 5, 2016 6 pages.
R1-1613263; Huawei et al.,"WF on LTE-NR Coexistence"; 3GPP TSG RAN WG1 #87; Reno, USA, Nov. 14-18, 2016; Agenda item: 7.1.7; total 11 pages.

* cited by examiner

DATA TRANSMISSION METHOD AND APPARATUS

CROSS-REFERENCE TO RELATED APPLICATIONS

This application is a continuation of International Application No. PCT/CN2018/071781, filed on Jan. 8, 2018, which claims priority to Chinese Patent Application No. 201710011451.9, filed on Jan. 6, 2017. The disclosures of the aforementioned applications are hereby incorporated by reference in their entireties.

TECHNICAL FIELD

The present disclosure relates to the field of mobile communications, and in particular, to a data transmission method and an apparatus.

BACKGROUND

In an Long Term Evolution (LTE) system, a radio frame on an air interface is divided into 10 subframes whose lengths are 1 ms, and each subframe includes two slots whose lengths are 0.5 ms. A minimum resource granularity is referred to as an resource element (RE), to be specific, a time-frequency grid including one time-domain symbol in time domain and one subcarrier in frequency domain. Uplink and downlink time-frequency domain physical resources form a physical resource block (PRB). One PRB includes 12 consecutive subcarriers in frequency domain and seven consecutive OFDM symbols (six consecutive orthogonal frequency division multiplexing (OFDM) symbols in a case of an extended CP) in time domain. In other words, a frequency domain width of one PRB is 180 kHz, and a time length of one PRB is 0.5 ms. Two PRBs form a PRB pair, and resources are allocated in a form of the PRB pair for uplink data scheduling.

The LTE Release 10 and later releases support carrier aggregation (CA). An LTE CA system includes one primary cell (PCell) and at least one secondary cell (SCell). To better manage battery consumption of user equipment (UE) on which CA is configured, LTE provides an activation/deactivation mechanism for the SCell (activation/deactivation of the PCell is not supported). The activation/deactivation mechanism of the UE is based on a combination of a media access control layer control element (MAC control element, MAC CE) and a deactivation timer deactivation timer. The MAC CE carries information about a bitmap of the SCell. If the bitmap is "1", it indicates that the corresponding SCell is activated; or if the bitmap is "0", it indicates that the corresponding SCell is deactivated. The SCell may be activated or deactivated based on the information about the bitmap. When the SCell is activated, the UE performs the following operations in the SCell: (1) sending a sound referencing symbol (SRS); (2) reporting channel quality information (CQI)/a precoding matrix indication (PMI)/a rank indication (RI)/a precoding type indicator (PTI) corresponding to the SCell; (3) detecting a physical downlink control channel (PDCCH) used by the SCell and transmitted in the SCell; and (4) sending a PUCCH signal if it is configured that a physical uplink control channel (PUCCH) needs to be sent in the SCell. When the SCell is deactivated, the UE does not perform the following operations in the SCell: 1) sending an SRS; (2) reporting CQI/a PMI/an RI/a PTI corresponding to the SCell; (3) transmitting uplink data (to-be-retransmitted data including pending); (4) sending a random access channel (RACH) signal; (5) detecting a PDCCH used by the SCell and transmitted in the SCell; and (6) sending a PUCCH signal.

To implement inter-cell interference coordination and avoidance, load balancing, and energy saving, a mechanism of adaptively turning on/off a cell by a base station is introduced in the LTE Release 12 and later releases. A turned-on cell/a turned-off cell corresponds to a different downlink transmission state: an on state/an off state. When a cell is off, the base station periodically sends a discovery signal (DRS) based on a discovery signal configuration. The UE does not detect any other signal than a DRS in the deactivated SCell, and the UE performs radio resource management (RRM) measurement on the SCell based on the DRS signal. When a cell is on, communication between the UE and the SCell is the same as communication between UE and an SCell in Rel. 10 when the SCell is in an active state.

An objective of 5G New Radio (NR) is to meet communication requirements such as enhanced mobile broadband, massive machine type communications (MTC), and ultra-reliable low latency communications (URLLC). A key technology design of the NR may use advanced technologies different from technologies in LTE such as a channel coding scheme, a multiple access scheme, and a signal waveform. In an operating scenario designed for the NR, an NR system may be deployed in both a frequency band below 6 GHz and a frequency band above 6 GHz.

The frequency band below 6 GHz is also a frequency band in which the LTE system is deployed. Therefore, at a later stage of LTE commercial use and an early stage of NR commercial use, a problem to be resolved is how to effectively allocate frequency resources in the frequency band below 6 GHz to meet a requirement for a smooth transition from the LTE system to the NR system. In a possible manner, the frequency band below 6 GHz is re-planned for use at an NR commercial use stage, so that the LTE system and the NR system operate in different frequency bands. However, in this manner, radio frequency bands are rigidly classified into LTE frequency bands and NR frequency bands. Consequently, usage of radio frequency resources cannot match a proportion requirement of LTE and NR services, and frequency resource utilization is relatively low. In another possible manner, the LTE system and the NR system are deployed in a same carrier. In this manner, spectral efficiency can be effectively improved, but it needs to be ensured that the NR system deployed on a resource in the frequency band does not affect normal running of the LTE system.

Therefore, when the LTE system and the NR system are deployed in a same carrier, how to improve spectrum utilization is a problem that needs to be resolved.

SUMMARY

This application describes a data transmission method and an apparatus to improve carrier utilization in a scenario in which two radio access network devices share a resource.

According to an aspect, an embodiment of the present disclosure provides an information transmission method, including:

determining, by a terminal device, a status of a shared resource, where the status includes an active state and an inactive state;

receiving, by the terminal device, resource configuration information when the status of the shared resource is the active state, where the resource configuration information is first resource configuration information or second resource configuration information, the first resource configuration information includes information about a resource occupied by a signal in a first signal set, the second resource configuration information includes information about a resource occupied by a signal in a second signal set, and the first signal set and the second signal set each correspond to a signal set of a second radio access network device; and receiving, by the terminal device in a target time unit based on the resource configuration information, downlink information sent by a first radio access network device by using a first resource, or sending, by the terminal device, uplink information to a first radio access network device in a target time unit based on the resource configuration information by using a second resource, where the first resource and the second resource are resources in shared resources except an occupied resource indicated by the resource configuration information; and a type of the first radio access network device is different from a type of the second radio access network device, the terminal device is a terminal device served by the first radio access network device, and the target time unit is any one of at least one first time unit included in a first time set.

Optionally, the method further includes: when the status of the shared resource is the inactive state, skipping receiving, by the terminal device, the resource configuration information, skipping receiving, by the terminal device, downlink information by using a first resource, or skipping sending, by the terminal device, uplink information by using a second resource, where the first resource and the second resource are resources in the shared resources except an occupied resource indicated by the resource configuration information, the downlink information includes downlink control information and/or downlink service information, and the uplink information includes uplink control information and/or uplink service information.

Optionally, the method further includes: receiving, by the terminal device, a discovery reference signal sent by the first radio access network device on a third resource in the shared resources.

Optionally, the first signal set includes a cell-specific reference (CRS), and a resource occupied by the CRS in the first signal set is located in each second time unit in the first time set; and the second signal set includes a CRS, and a resource occupied by the CRS in the second signal set is located in some second time units in the first time set; or the second signal set does not include a CRS.

Optionally, the first signal set further includes at least one of a primary synchronization signal (PSS), a secondary synchronization signal (SSS), and a physical broadcast channel (PBCH); or the first signal set further includes at least one of a PSS, an SSS, a PBCH, a physical downlink control channel (PDCCH), a physical hybrid automatic repeat request (HARQ) indicator channel (PHICH), and a physical control format indicator channel (PCFICH), where the PSS and the SSS in the first signal set are information sent by the second radio access network device on the shared resources based on a first period, a time length of the first period includes time lengths of N second time units, and N is a natural number.

Optionally, the second signal set further includes at least one of a PSS and an SSS, the PSS and the SSS in the second signal set are sent on the shared resources based on a second period, duration of the second period includes duration of M second time units, and M is a natural number greater than N.

Optionally, the first resource configuration information further includes multi-broadcast single-frequency network (MBSFN) configuration information, and the MBSFN configuration information corresponds to an MBSFN configuration of the second radio access network device; and the second resource configuration information does not include the MBSFN configuration information.

Optionally, the first signal set includes at least one of a physical random access channel (PRACH), a sounding reference symbol (SRS), and a physical uplink control channel (PUCCH), and the second signal set is an empty set.

Optionally, the receiving, by the terminal device, resource configuration information includes:

receiving, by the terminal device, first indication information, where the first indication information is used to indicate that the resource configuration information is the first resource configuration information or the second resource configuration information.

Optionally, the determining, by a terminal device, a status of a shared resource includes:

receiving, by the terminal device, second indication information, where the second indication information is used to indicate the status of the shared resource; and determining, by the terminal device, the status of the shared resource by using the second indication information.

Optionally, the first indication information and the second indication information are carried in a same message.

Optionally, a maximum value of duration of a time period from a moment at which the terminal device receives the first indication information to a moment at which the resource configuration information indicated by the first indication information takes effect is less than a first threshold; and the first threshold is a maximum value of duration of a time period from a moment at which the terminal device receives the second indication information to a moment at which the status that is of the shared resource and that is indicated by the second indication information takes effect.

Optionally, the method further includes: receiving, by the terminal device, third indication information, where the third indication information is used to indicate the first resource configuration information and the second resource configuration information.

Optionally, the first indication information includes a MAC CE or physical downlink control information; the second indication information includes a MAC CE; or the third indication information includes radio resource control (RRC) signaling.

According to still another aspect, an embodiment of the present disclosure provides an information transmission method, including:

determining, by a first radio access network device, a status of a shared resource, where the status includes an active state and an inactive state;

determining and sending, by the first radio access network device, resource configuration information when the status of the shared resource is the active state, where the resource configuration information is first resource configuration information or second resource configuration information, the first resource configuration information includes information about a resource occupied by a signal in a first signal set, the second resource configuration information includes information about a resource occupied by a signal in a second signal set, and the first signal set and the second signal set each correspond to a signal set of a second radio access network device; and sending, by the first radio access network device, downlink information to a terminal device in a target time unit based on the resource configuration information by using a first resource, or receiving, by the first radio access network device in a target time unit based on the resource configuration information by using a second resource, uplink information sent by a terminal device, where the first resource and the second resource are resources in shared resources except an occupied resource indicated by the resource configuration information; and a type of the first radio access network device is different from a type of the second radio access network device, the terminal device is a terminal device served by the first radio access network device, and the target time unit is any one of at least one first time unit included in a first time set.

Optionally, the method further includes: when the status of the shared resource is the inactive state, skipping sending, by the first radio access network device, the resource configuration information, skipping sending, by the first radio access network device, downlink information by using a first resource, or skipping receiving, by the first radio access network device, uplink information by using a second resource, where the first resource and the second resource are resources in the shared resources except an occupied resource indicated by the resource configuration information, the downlink information includes downlink control information and/or downlink service information, and the uplink information includes uplink control information and/or uplink service information.

Optionally, the method further includes: sending, by the first radio access network device, a discovery reference signal on a third resource in the shared resources.

Optionally, the first signal set includes a cell-specific reference signal (CRS), and a resource occupied by the CRS in the first signal set is located in each second time unit in the first time set; and the second signal set includes a CRS, and a resource occupied by the CRS in the second signal set is located in some second time units in the first time set; or the second signal set does not include a CRS.

Optionally, the first signal set further includes at least one of a primary synchronization signal (PSS), an secondary synchronization signal (SSS), and a physical broadcast channel (PBCH); or the first signal set further includes at least one of a PSS, an SSS, a PBCH, a physical downlink control channel (PDCCH), a physical hybrid automatic repeat request (HARQ) indicator channel (PHICH), and a physical control format indicator channel (PCFICH), where the PSS and the SSS in the first signal set are information sent by the second radio access network device on the shared resources based on a first period, a time length of the first period includes time lengths of N second time units, and N is a natural number.

Optionally, the second signal set further includes at least one of a PSS and an SSS, the PSS and the SSS in the second signal set are sent on the shared resources based on a second period, duration of the second period includes duration of M second time units, and M is a natural number greater than N.

Optionally, the first resource configuration information further includes multicast-broadcast single-frequency network (MBSFN) configuration information, and the MBSFN configuration information corresponds to an MBSFN configuration of the second radio access network device; and the second resource configuration information does not include the MBSFN configuration information.

Optionally, the first signal set includes at least one of a physical random access channel (PRACH), an sounding reference symbol (SRS), and a physical uplink control channel (PUCCH), and the second signal set is an empty set.

Optionally, the method further includes: sending, by the first radio access network device, first indication information to the terminal device, where the first indication information is used to indicate that the resource configuration information is the first resource configuration information or the second resource configuration information.

Optionally, the method further includes: sending, by the first radio access network device, second indication information to the terminal device, where the second indication information is used to indicate the status of the shared resource.

Optionally, the first indication information and the second indication information are carried in a same message.

Optionally, the method further includes: sending, by the first radio access network device, third indication information to the terminal device, where the third indication information is used to indicate the first resource configuration information and the second resource configuration information.

Optionally, the first indication information includes a MAC CE or physical downlink control information; the second indication information includes a MAC CE; or the third indication information includes radio resource control (RRC) signaling.

According to an aspect, an embodiment of the present disclosure provides a terminal device, including:

a determining unit, configured to determine a status of a shared resource, where the status includes an active state and an inactive state; and a transceiver unit, configured to receive resource configuration information when the status of the shared resource is the active state, where the resource configuration information is first resource configuration information or second resource configuration information, the first resource configuration information includes information about a resource occupied by a signal in a first signal set, the second resource configuration information includes information about a resource occupied by a signal in a second signal set, and the first signal set and the second signal set each correspond to a signal set of a second radio access network device, where the determining unit is further configured to determine a first resource or a second resource from shared resources based on the resource configuration information, where the first resource and the second resource are resources in the shared resources except an occupied resource indicated by the resource configuration information; and the transceiver unit is further configured to: receive, in a target time unit, downlink information sent by a first radio access network device by using the first resource, or send uplink information to a first radio access network device in a target time unit by using the second resource, where a type of the first radio access network device is different from a type of the second radio access network device, the terminal device is a terminal device served by the first radio access network device, and the target time unit is any one of at least one first time unit included in a first time set.

Optionally, when the status of the shared resource is the inactive state, the transceiver unit skips receiving the resource configuration information, the transceiver unit skips receiving downlink information by using a first resource, or the transceiver unit skips sending uplink information by using a second resource, where the first resource and the second resource are resources in the shared resources except an occupied resource indicated by the resource configuration information, the downlink information includes downlink control information and/or downlink service information, and the uplink information includes uplink control information and/or uplink service information.

Optionally, the transceiver unit is further configured to receive a discovery reference signal sent by the first radio access network device on a third resource in the shared resources.

Optionally, the first signal set includes a cell-specific reference signal (CRS), and a resource occupied by the CRS in the first signal set is located in each second time unit in the first time set; and the second signal set includes a CRS, and a resource occupied by the CRS in the second signal set is located in some second time units in the first time set; or the second signal set does not include a CRS.

Optionally, the first signal set further includes at least one of a PSS, an SSS, and a PBCH; or the first signal set further includes at least one of a PSS, an SSS, a PBCH, a PDCCH, a PHICH, and a PCFICH, where the PSS and the SSS in the first signal set are information sent by the second radio access network device on the shared resources based on a first period, a time length of the first period includes time lengths of N second time units, and N is a natural number.

Optionally, the second signal set further includes at least one of a PSS and an SSS, the PSS and the SSS in the second signal set are sent on the shared resources based on a second period, duration of the second period includes duration of M second time units, and M is a natural number greater than N.

Optionally, the first resource configuration information further includes MBSFN configuration information, and the MBSFN configuration information corresponds to an MBSFN configuration of the second radio access network device; and the second resource configuration information does not include the MBSFN configuration information.

Optionally, the first signal set includes at least one of a PRACH, an SRS, and a PUCCH, and the second signal set is an empty set.

Optionally, the transceiver unit is configured to receive first indication information, where the first indication information is used to indicate that the resource configuration information is the first resource configuration information or the second resource configuration information.

Optionally, the transceiver unit is configured to receive second indication information, where the second indication information is used to indicate the status of the shared resource; and the determining unit is configured to determine the status of the shared resource by using the second indication information.

Optionally, the first indication information and the second indication information are carried in a same message.

Optionally, a maximum value of duration of a time period from a moment at which the terminal device receives the first indication information to a moment at which the resource configuration information indicated by the first indication information takes effect is less than a first threshold; and the first threshold is a maximum value of duration of a time period from a moment at which the terminal device receives the second indication information to a moment at which the status that is of the shared resource and that is indicated by the second indication information takes effect.

Optionally, the transceiver unit is further configured to receive third indication information, where the third indication information is used to indicate the first resource configuration information and the second resource configuration information.

Optionally, the first indication information includes a MAC CE or physical downlink control information; the second indication information includes a MAC CE; or the third indication information includes RRC signaling.

According to another aspect, an embodiment of the present disclosure provides a first radio access network device, including:

a determining unit, configured to: determine a status of a shared resource, where the status includes an active state and an inactive state; and determine and send resource configuration information when the status of the shared resource is the active state, where the resource configuration information is first resource configuration information or second resource configuration information, the first resource configuration information includes information about a resource occupied by a signal in a first signal set, the second resource configuration information includes information about a resource occupied by a signal in a second signal set, and the first signal set and the second signal set each correspond to a signal set of a second radio access network device, where the determining unit is further configured to determine a first resource or a second resource from shared resources based on the resource configuration information, where the first resource and the second resource are resources in the shared resources except an occupied resource indicated by the resource configuration information; and a transceiver unit, configured to: send downlink information to a terminal device in a target time unit by using the first resource, or receive, in a target time unit by using the second resource, uplink information sent by a terminal device, where a type of the first radio access network device is different from a type of the second radio access network device, the terminal device is a terminal device served by the first radio access network device, and the target time unit is any one of at least one first time unit included in a first time set.

Optionally, when the status of the shared resource is the inactive state, the transceiver unit skips sending resource configuration information, the transceiver unit skips sending downlink information by using a first resource, or the transceiver unit skips receiving uplink information by using a second resource, where the first resource and the second resource are resources in the shared resources except an occupied resource indicated by the resource configuration information, the downlink information includes downlink control information and/or downlink service information, and the uplink information includes uplink control information and/or uplink service information.

Optionally, the transceiver unit is further configured to send a discovery reference signal on a third resource in the shared resources.

Optionally, the first signal set includes a CRS, and a resource occupied by the CRS in the first signal set is located in each second time unit in the first time set; and the second signal set includes a CRS, and a resource occupied by the CRS in the second signal set is located in some second time units in the first time set; or the second signal set does not include a CRS.

Optionally, the first signal set further includes at least one of a PSS, an SSS, and a PBCH; or the first signal set further includes at least one of a PSS, an SSS, a PBCH, a PDCCH, a PHICH, and a PCFICH, where the PSS and the SSS in the first signal set are information sent by the second radio access network device on the shared resources based on a first period, a time length of the first period includes time lengths of N second time units, and N is a natural number.

Optionally, the second signal set further includes at least one of a PSS and an SSS, the PSS and the SSS in the second signal set are sent on the shared resources based on a second period, duration of the second period includes duration of M second time units, and M is a natural number greater than N.

Optionally, the first resource configuration information further includes MBSFN configuration information, and the MBSFN configuration information corresponds to an MBSFN configuration of the second radio access network device; and the second resource configuration information does not include the MBSFN configuration information.

Optionally, the first signal set includes at least one of a PRACH, an SRS, and a PUCCH, and the second signal set is an empty set.

Optionally, the transceiver unit is further configured to send first indication information to the terminal device, where the first indication information is used to indicate that the resource configuration information is the first resource configuration information or the second resource configuration information.

Optionally, the transceiver unit is further configured to send second indication information to the terminal device, where the second indication information is used to indicate the status of the shared resource.

Optionally, the first indication information and the second indication information are carried in a same message.

Optionally, the transceiver unit is further configured to send third indication information, where the third indication information is used to indicate the first resource configuration information and the second resource configuration information.

Optionally, the first indication information includes a MAC CE or physical downlink control information; the second indication information includes a MAC CE; or the third indication information includes RRC signaling.

According to still another aspect, an embodiment of the present disclosure provides a communications system, where the system includes the radio access network device and the terminal device in the foregoing aspects.

Still another aspect of this application provides a computer readable storage medium, where the computer readable storage medium stores an instruction, and when the instruction runs on a computer, the computer performs the methods in the foregoing aspects.

Still another aspect of this application provides a computer program product including an instruction, where when the instruction runs on a computer, the computer performs the methods in the foregoing aspects.

The solutions provided in the present disclosure may be applied to a scenario in which two radio access network devices share a resource. The first radio access network device indicates, to the terminal device served by the first radio access network device, resource occupation states corresponding to different states of the second access network device on the shared resource. Therefore, the terminal device may determine an available resource in a shared carrier based on a resource occupation state, and communicate with the first access network device by using the available resource. In this way, the first access network device can use the shared resource regardless of a status of the second access network device on the shared resource, so that different types of radio access network devices flexibly and efficiently coexist on the shared resource. This improves utilization of the shared resource.

DESCRIPTION OF EMBODIMENTS

The following describes the technical solutions in the embodiments of the present disclosure with reference to the accompanying drawings.

Figure 1:
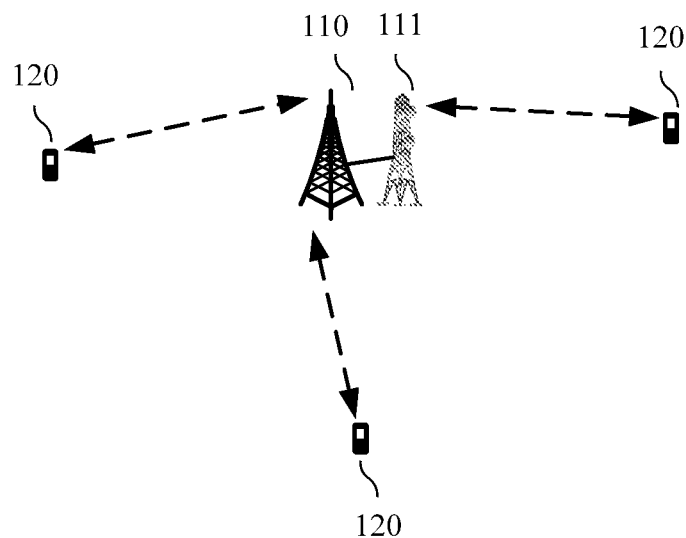
FIG. 1 is a schematic diagram of an application scenario according to the present disclosure.

FIG. 1 shows a communications system 100 to which embodiments of the present disclosure are applied. The communications system 100 may include at least one first radio access network device 110, at least one second radio access network device 111, and a plurality of terminal devices 120 located within coverage of the radio access network devices 110 and 111. At least one terminal device 120 communicates with the radio access network device 110, and at least one terminal device 120 communicates with the radio access network device 111. The first radio access network device 110 and the second radio access network device 110 are radio access network devices supporting wireless communication protocols of different generations, and communicate with the terminal devices 120 by using different communication protocols. For example, the first radio access network device is a base station supporting an LTE protocol, and the second radio access network device is a base station supporting a 5G protocol. FIG. 1 shows two radio access network devices and three terminal devices as an example. Optionally, the communications system 100 may include a plurality of radio access network devices, and another quantity of terminal devices may be included within coverage of each radio access network device. Optionally, the first radio access network device 110 and the second radio access network device 111 may be a same physical entity, or two physical entities linked through an ideal backhaul. This is not limited in the embodiments of the present disclosure.

Optionally, the wireless communications system 100 may further include other network entities such as a network controller and a mobility management entity, but the embodiments of the present disclosure are not limited thereto.

The communions system to which the embodiments of the present disclosure are applied may be a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), another wireless communications system in which an orthogonal frequency division multiplexing (OFDM) technology is applied, or the like.

System architectures and service scenarios described in the embodiments of the present disclosure are intended to describe the technical solutions in the embodiments of the present disclosure more clearly, and do not constitute any limitation to the technical solutions provided in the embodiments of the present disclosure. A person of ordinary skill in the art may know that with evolution of a network architecture and emergence of a new service scenario, the technical solutions provided in the embodiments of the present disclosure are also applicable to similar technical problems. The radio access network device in the embodiments of the present disclosure may be used to provide a wireless communication function for a terminal device. The radio access network device may be a macro base station, a micro base station (also referred to as a small cell), a relay station, an access point, and the like in various forms. The radio access network device may be a base transceiver station (BTS) in GSM or CDMA, or may be a NodeB (NodeB, NB) in WCDMA, or may be an evolved NodeB (Evolutional Node B, eNB, or e-NodeB) in LTE, or may be a corresponding device gigabit NodeB (gNB) in a 5G network. For ease of description, in all the embodiments of the present disclosure, the foregoing apparatuses providing wireless communication functions for terminal devices are collectively referred to as radio access network devices.

In the embodiments of the present disclosure, the terminal device may also be referred to as user equipment (UE), a mobile station (MS), a mobile terminal (Mobile Terminal), or the like. The terminal device may communicate with one or more core networks by using a radio access network (RAN). For example, the terminal device may be a mobile phone (or referred to as a "cellular" phone), a computer with a mobile terminal, or the like. For example, the terminal device may be alternatively a portable, pocket-sized, handheld, computer built-in, or in-vehicle mobile apparatus, which exchanges voice and/or data with the radio access network. This is not limited in the embodiments of the present disclosure.

Currently, for an application scenario in which both an LTE system and an NR system are deployed on a shared resource, and the shared resource corresponds to one SCell in the LTE system, to prevent the NR system from affecting normal running of the LTE system, the NR system may be supported on the shared resource when the SCell in the LTE system is off. A base station may turn off an SCell configured for UE in the LTE system, and allocate resources of the SCell other than a DRS resource to the NR system for use. This not only ensures normal running of the LTE system, but also achieves an objective of deploying both the LTE system and the NR system in a same carrier.

Although the foregoing solution may support deploying both the LTE system and the NR system in the same carrier, an on state and an off state of the SCell in the LTE system are indicated to the UE by using a MAC CE, and signaling that indicates the on state and the off state of the SCell to the LTE UE does not take effect immediately. For example, after the base station indicates, to the UE, that an SCell is switched from the off state to the on state, the UE may consider, after 34 ms at the latest, that signaling indicating the on state of the SCell takes effect. After the base station indicates, to the UE, that an SCell is switched from the on state to the off state, the UE may consider, after 8 ms at the latest, that signaling indicating the off state of the SCell takes effect. Therefore, to support coexistence of the LTE system and the NR system in the same carrier, frequent switching of the SCell in the LTE system between the on state and the off state leads to very low spectrum utilization of the shared resource.

Figure 2:
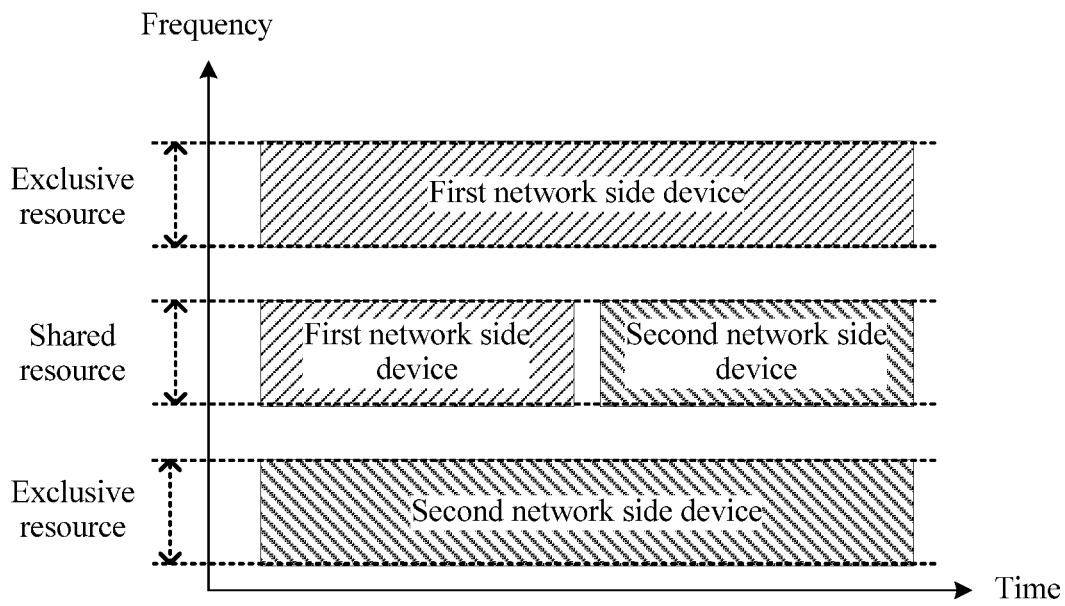
FIG. 2 is a schematic diagram of a scenario in which a first radio access network device and a second radio access network device share a resource according to the present disclosure.

The solutions in the present disclosure are applicable to a scenario in which the first radio access network device and the second radio access network device share a resource in a time division manner and/or a frequency division manner. For example, as shown in FIG. 2, the first radio access network device and the second radio access network device each have an exclusive resource for communicating with a served terminal device. In addition, both the first radio access network device and the second radio access network device can use a shared resource to communicate with served terminal devices.

For example, the first radio access network device is a gigabit NodeB (gNB) in the NR system, and the second radio access network device is an evolved NodeB (eNB) in the LTE system. In this application, to improve utilization of a shared resource in a scenario in which both the LTE system and the NR system are deployed on the shared resource, the NR system can use the shared resource when an LTE device is in an on state or an off state. The radio access network device in the NR system indicates, to the terminal device served by the radio access network device in the NR system, resource occupation states corresponding to different states of the LTE device on the shared resource, so that the terminal device in the NR system determines an available resource in a shared carrier. In this way, the LTE system and the NR system flexibly and efficiently coexist in the shared carrier. This improves utilization of the shared resource.

Figure 3:
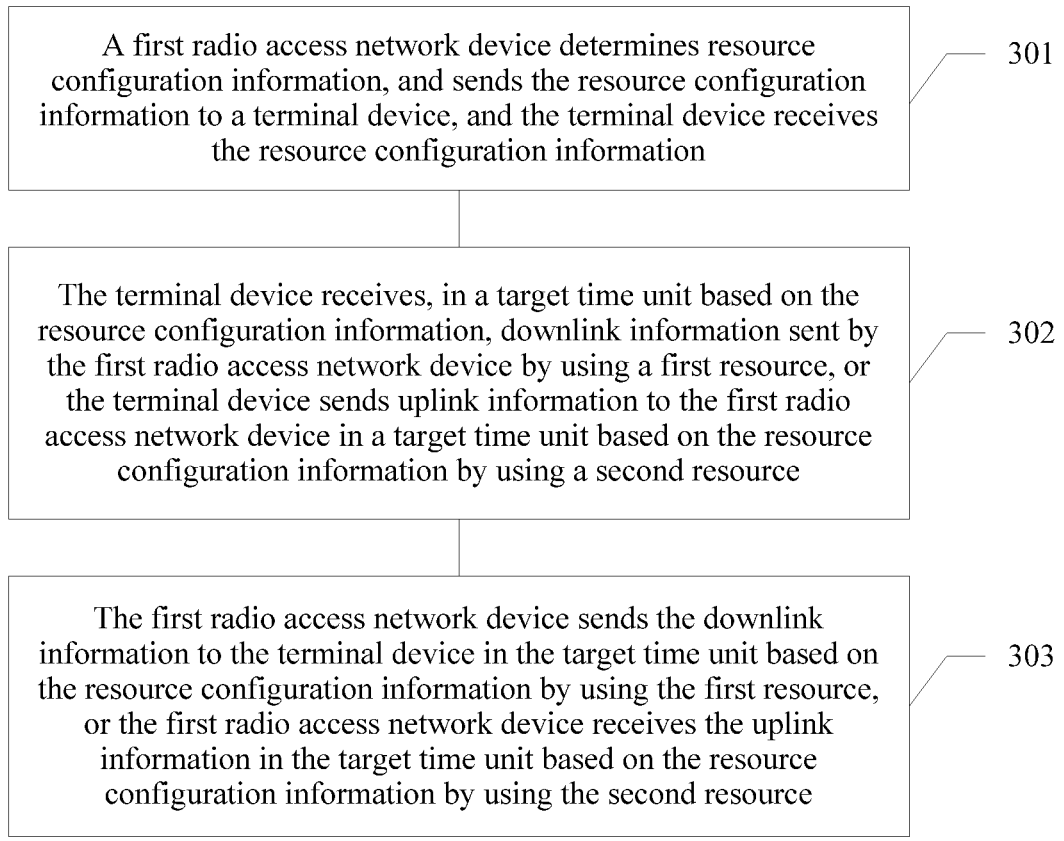
FIG. 3 is a schematic flowchart of an embodiment of a data transmission method according to the present disclosure.

Referring to FIG. 3, an embodiment of a data transmission method according to the present disclosure includes the following operations.

S301: A first radio access network device determines resource configuration information, and sends the resource configuration information to a terminal device, and the terminal device receives the resource configuration information.

The resource configuration information is used to indicate information about a resource occupied by a second radio access network device in shared resources. The resource configuration information has two status values: first resource configuration information and second resource configuration information, which correspond to different states of the second radio access network device. For example, a status of the shared resource of the second radio access network device includes an on state and an off state.

The resource configuration information is the first resource configuration information or the second resource configuration information. The first resource configuration information includes information about a resource occupied by a signal in a first signal set, and the second resource configuration information includes information about a resource occupied by a signal in a second signal set. The first signal set and the second signal set each correspond to a signal set of the second radio access network device. A type of the first radio access network device is different from a type of the second radio access network device, and the terminal device is a terminal device served by the second radio access network device.

Optionally, that a type of the first radio access network device is different from a type of the second radio access network device means that the first radio access network device and the second radio access network device are radio access network devices supporting wireless communication protocols of different generations. For example, the first radio access network device supports a 5G NR system, and the second radio access network device supports a 4G LTE system. For example, the first radio access network device is a gigabit NodeB, and the second radio access network device is an eNB.

S302: The terminal device receives, in a target time unit based on the resource configuration information, downlink information sent by the first radio access network device by using a first resource, or the terminal device sends uplink information to the first radio access network device in a target time unit based on the resource configuration information by using a second resource, where the first resource and the second resource are resources in shared resources except an occupied resource indicated by the resource configuration information, and the target time unit is any one of at least one first time unit included in a first time set.

S303: The first radio access network device sends the downlink information to the terminal device in the target time unit based on the resource configuration information by using the first resource, or the first radio access network device receives the uplink information in the target time unit based on the resource configuration information by using the second resource.

Whether the first radio access network device sends or receives information corresponds to the terminal device. If the terminal device sends uplink information, the first radio access network device receives the uplink information sent by the terminal device. If the first radio access network device sends downlink information to the terminal device, the terminal device receives the downlink information. A manner of determining the first resource and the second resource in operation S302 is similar to that in operation S303.

A scheduling granularity used for communication between the first radio access network device and a served terminal device may be different from a scheduling granularity used for communication between the second radio access network device and a served terminal device. For example, a length of the scheduling granularity used by the first radio access network device in time is a length of the first time unit, and a length of the scheduling granularity used by the second radio access network device in time is a length of a second time unit. For example, when the second radio access network device is an eNB in the LTE system, the length of the second time unit is 1 ms. A work plan for the first release of 5G New Radio (NR) standardization was approved in RP-160671 at the 3GPP RAN #71 meeting in March 2016. A size of a scheduling resource unit in the NR system is more flexible. A scheduling granularity in the NR system may be less than 1 ms in time. In other words, the length of the first time unit may be less than that of the second time unit.

This embodiment of the present disclosure is mainly used for the first radio access network device and the terminal device served by the first radio access network device. In other words, the terminal device in this embodiment of the present disclosure is the terminal device served by the first radio access network device.

Optionally, the uplink information includes uplink control data and/or uplink service data. The downlink information includes downlink control data and/or downlink service data, and the downlink information does not include a discovery reference signal DRS.

Figure 4:
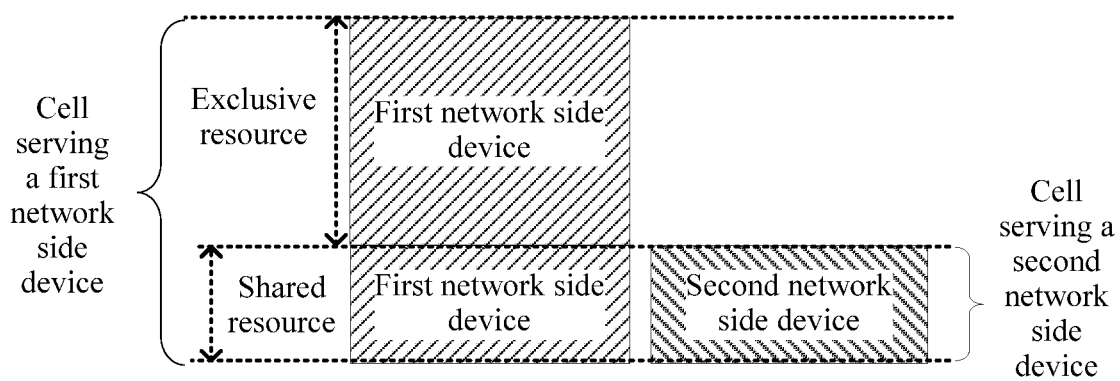
FIG. 4 is a schematic diagram of a scenario in which a first radio access network device and a second radio access network device share a resource according to the present disclosure.

For the first radio access network device, the shared resource may be a part of a frequency band of a working cell, or may be an entire frequency band of a cell. For the second radio access network device, the shared resource may be a part of a frequency band of a working cell, or may be an entire frequency band of a cell. As shown in FIG. 4, the shared resource is a part of a frequency band of a working cell for the first radio access network device, but is an entire frequency band of a working cell for the second radio access network device.

The first radio access network device and the second radio access network device have respective statuses on the shared resource. For example, a status of the shared resource of the first radio access network device includes an active state and an inactive state, and a status of the shared resource of the second radio access network device includes an on state and an off state. Because the first radio access network device and the second radio access network device share a resource in the shared resources in an orthogonal manner, a status of the second radio access network device on the shared resource affects a resource available to the first radio access network device in the shared resources. For example, the second radio access network device is an eNB in the LTE system. In this case, the shared resource corresponds to a cell in the LTE system, and the length of the first time unit is 1 ms. When the cell is in the on state, information received by a terminal device in the LTE system in a downlink subframe of the cell includes a CRS, a PSS, an SSS, a PBCH, a PDCCH, a PHICH, a PCFICH, a physical downlink shared channel (PDSCH), and the like. Information sent by the terminal device in the LTE system in an uplink subframe of the cell includes a PUCCH, a PRACH, an SRS, a PUSCH, and the like. When the cell is in the off state, information received by the terminal device in the LTE system in the downlink subframe of the cell includes a CRS, a PSS, an SSS, and the like during a DRS burst, and the terminal device does not send information in the uplink subframe of the cell. In addition, when the cell is in a first special on state, information received by the terminal device in the LTE system in the downlink subframe of the cell includes a CRS, a PSS, an SSS, and a PBCH, and does not include a PDCCH, and the terminal device in the LTE system does not send information in the uplink subframe of the cell. Further, in a subsequent evolved system, the status of the shared resource corresponding to the LTE system may further include a second special on state and a second off state. The second special on state is similar to the on state, and a difference lies in that a state in which the access network device in the LTE system sends, by using a MAC CE, the status of the shared resource to UE served by the access network device in the LTE system is a first on state, and a state in which the access network device in the LTE system sends, by using physical control information, the status of the shared resource to the UE served by the access network device in the LTE system is the second special on state. The second off state is similar to the off state, and a difference lies in that a state in which the access network device in the LTE system sends, by using a MAC CE, the status of the shared resource to UE served by the access network device in the LTE system is the off state, and a state in which the access network device in the LTE system sends, by using physical control information, the status of the shared resource to the UE served by the access network device in the LTE system is the second off state. Further, the access network device in the LTE system may be in another state on the shared resource. Resources available to the first radio access network device and the terminal device served by the first radio access network device vary with the status of the access network device in the LTE system on the shared resource.

If a priority of occupying the shared resource by the second radio access network device is higher than that of occupying the shared resource by the first radio access network device, the terminal device served by the first radio access network device needs to obtain a resource that is used by the second radio access network device in the shared resources and that corresponds to the status of the shared resource of the second radio access network device, to determine a resource that can be used by the terminal device in the shared resources when the terminal device communicates with the first radio access network device.

The terminal device served by the first radio access network device may determine, by learning whether the resource configuration information is the first resource configuration information or the second resource configuration information, the resource used by the second radio access network device in the shared resources. Herein, the first resource configuration information corresponds to a first state of the second radio access network device on the shared resource, and the second resource configuration information corresponds to a second state of the second radio access network device on the shared resource. Optionally, the terminal device served by the first radio access network device may determine, by learning that the resource configuration information is which one of R types of resource configuration information, the resource used by the second radio access network device in the shared resources, where R is an integer greater than or equal to 2. A $J^{th}$ type of resource configuration information in the R types of resource configuration information includes information about a resource occupied by a signal in a $J^{th}$ resource configuration signal set. Each of the R types of resource configuration information corresponds to a signal set of the second radio access network device. J is less than or equal to R. The R types of resource configuration information correspond to R states of the second radio access network device on the shared resource. Optionally, the R types of resource configuration information include the first resource configuration information and the second resource configuration information. An example in which R=2 is used below for description. A solution when R>2 is similar to a solution when R=2 for the method and the apparatus of the present disclosure, and can be obtained by correspondingly extending the solution when R=2.

For example, the first resource configuration information includes information about a resource occupied by a signal in the first signal set. The information about the resource occupied by the signal in the first signal set corresponds to a resource that is occupied by the second radio access network device when the second radio access network device is in the first state on the shared resource. In a second time unit of the second radio access network device on the shared resource: (1) if the second time unit is a downlink second time unit, a resource in the second time unit other than a resource used by the second radio access network device to send a CRS, a PSS, an SSS, a PBCH, a PDCCH, a PHICH, a PCFICH, or a PDSCH is a resource that can be used by the first radio access network device, or a resource in the downlink time unit other than a resource used by the second radio access network device to send a CRS, a PSS, an SSS, or a PBCH is a resource that can be used by the first radio access network device; (2) if the second time unit is an uplink second time unit, a resource in the second time unit other than a resource used by a terminal device served by the second radio access network device to send a PUCCH, a PRACH, an SRS, or a PUSCH is a resource that can be used by the first radio access network device.

The second resource configuration information includes information about a resource occupied by a signal in the second signal set. The information about the resource occupied by the signal in the second signal set corresponds to a resource that is occupied by the second radio access network device when the second radio access network device is in the second state on the shared resource. To be specific, in a second time unit of the second radio access network device on the shared resource: (1) if the second time unit is a downlink time unit, a resource in the downlink time unit other than a resource used by the second radio access network device to send a DRS is a resource that can be used by the first radio access network device; (2) if the second time unit is an uplink time unit, all resources in the uplink time unit are resources that can be used by the first radio access network device.

The terminal device served by the first radio access network device may receive, in the target time unit based on the received resource configuration information, the downlink information sent by the first radio access network device on the first resource in the shared resources. The downlink information herein includes downlink control information and/or downlink data information. Alternatively, the terminal device served by the first radio access network device may send the uplink information to the first radio access network device in the target time unit based on the obtained resource configuration information by using the second resource in the shared resources. The downlink information herein includes uplink control information and/or uplink data information. The first resource does not include a signal-occupied resource indicated by the resource configuration information. The second resource does not include a signal-occupied resource indicated by the resource configuration information. For example, the terminal device served by the first radio access network device may determine scheduling resources based on received scheduling information, and determine, based on the resource configuration information, a resource that cannot be used in the scheduling resources, to determine the first resource. Likewise, the second resource may be determined. In this embodiment, as the status of the second radio access network device on the shared resource varies, signals included in the first signal set and the second signal set occupy different resources. The first signal set and the second signal set each correspond to a signal set of the second radio access network device. The first resource configuration information may correspond to a resource occupied by a signal in the first signal set in one second time unit, or may correspond to resources occupied by a signal in the first signal set in a plurality of second time units. The second resource configuration information may correspond to a resource occupied by a signal in the second signal set in one second time unit, or may correspond to resources occupied by a signal in the second signal set in a plurality of second time units. The first resource configuration information corresponds to the first state of the shared resource of the second radio access network device. The second resource configuration information corresponds to the second state of the shared resource of the second radio access network device. The status of the shared resource of the second radio access network device may be the same in a plurality of subframes. Therefore, the resource configuration information may be effective in a range of one or more target time units. In other words, the target time unit is any one of the at least one first time unit included in the first time set.

The first resource and the second resource are resources in the shared resources except the occupied resource indicated by the resource configuration information. In other words, the first resource does not include the signal-occupied resource indicated by the resource configuration information, and the second resource does not include the signal-occupied resource indicated by the resource configuration information. Because the first resource configuration information may correspond to the resource occupied by the signal in the first signal set in one second time unit, or may correspond to the resources occupied by the signal in the first signal set in the plurality of second time units, the first resource does not include the signal-occupied resource indicated by the resource configuration information. In other words, the first resource does not include a resource that is in the target time unit and that is in the signal-occupied resource indicated by the resource configuration information. Likewise, the second resource does not include the signal-occupied resource indicated by the resource configuration information. In other words, the second resource does not include a resource that is in the target time unit and that is in the signal-occupied resource indicated by the resource configuration information. If the second time unit corresponds to downlink transmission of the second radio access network device, a resource in the second time unit other than a resource used by the second radio access network device to send a CRS, a PSS, an SSS, a PBCH, a PDCCH, a PHICH, a PCFICH, or a PDSCH is a resource that can be used by the first radio access network device. The terminal device served by the first radio access network device receives the downlink information sent by the first network device by using the first resource, and the first resource does not include the resource occupied by such information. If the second time unit corresponds to uplink transmission of the second radio access network device, a resource in the second time unit other than a resource configured by the second radio access network device for at least one of a PUCCH, a PRACH, an SRS, and a PUSCH is a resource that can be used by the first radio access network device. The terminal device served by the first radio access network device receives the downlink information sent by the first network device by using the first resource, and the first resource does not include the resource occupied by such information. Likewise, if the second time unit corresponds to downlink transmission of the second radio access network device, the second resource does not include a resource occupied by a CRS, a PSS, an SSS, a PBCH, a PDCCH, a PHICH, a PCFICH, or a PDSCH sent by the second radio access network device. If the second time unit corresponds to uplink transmission of the second radio access network device, the second resource does not include the resource configured by the second radio access network device for at least one of a PUCCH, a PRACH, an SRS, and a PUSCH.

For example, the terminal device served by the first radio access network device may determine scheduling resources based on received scheduling information, and determine, based on the resource configuration information, whether there is a resource that cannot be used in the scheduling resources and which resource cannot be used in the scheduling resources, to determine the second resource.

The first radio access network device sends the downlink information to the terminal device in the target time unit based on the resource configuration information by using the first resource. The terminal device receives, in the target time unit based on the resource configuration information, the downlink information sent by the first radio access network device by using the first resource. The downlink information includes the downlink control information and/or the downlink data information. Preferably, the downlink information herein includes the downlink control information, or includes the downlink control information and the downlink data information. In this solution, because resources occupied by the downlink data information and the uplink data information may be indicated by the downlink control information, manners in which the first radio access network device and the terminal device served by the first radio access network device determine the resources occupied by the downlink data information and the uplink data information may be entirely indicated by the downlink control information instead of depending on the resource configuration information. For example, the first radio access network device directly notifies, by using the downlink control information to the terminal device served by the first radio access network device, a resource that needs to be removed from resources to be occupied by the downlink data information. A resource occupied by the downlink control information needs to be determined by the first radio access network device based on the resource configuration information. The terminal device served by the first radio access network device needs to determine, based on the resource configuration information, the resource occupied by the downlink control information. Optionally, a resource occupied by the downlink data information and/or a resource occupied by the uplink control information are/is determined according to an indication of the downlink control information.

In this embodiment, the first radio access network device indicates, to the terminal device served by the first radio access network device, resource occupation states corresponding to different states of the second access network device on the shared resource. The terminal device may determine an available resource in a shared carrier based on a resource occupation state, and communicate with the first access network device by using the available resource. In this way, the first access network device can use the shared resource regardless of a status of the second access network device on the shared resource, so that different types of radio access network devices flexibly and efficiently coexist on the shared resource. This improves utilization of the shared resource.

An example in which the LTE system coexists with the NR system is used. The radio access network device in the NR system indicates, to the terminal device served by the radio access network device in the NR system, resource occupation states corresponding to different states of an LTE device on the shared resource, so that the terminal device in the NR system determines an available resource in a shared carrier. In this way, the NR system can use the shared resource when the LTE device is in the on state or the off state, so that the LTE system and the NR system flexibly and efficiently coexist in the shared carrier. This improves utilization of the shared resource.

Figure 5:
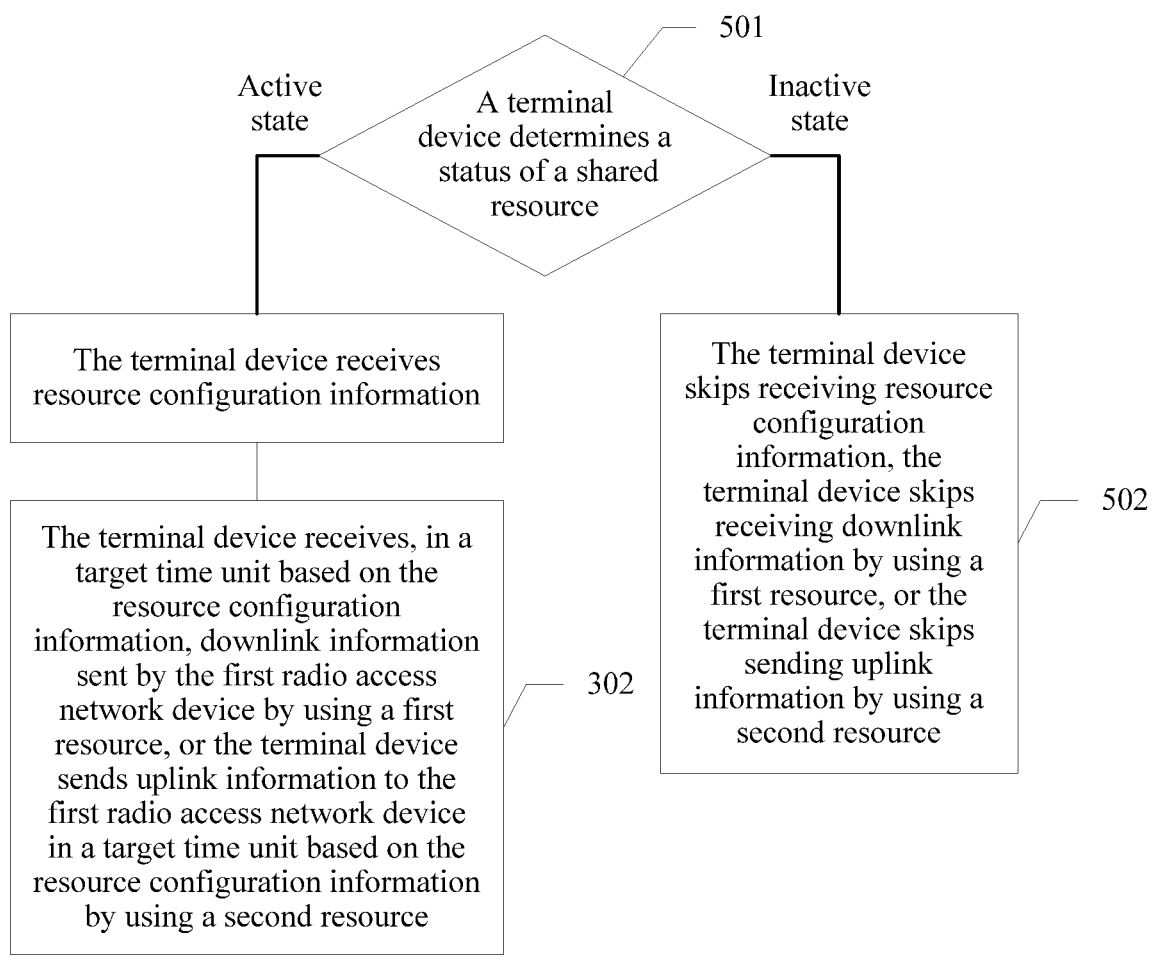
FIG. 5 is a schematic flowchart of another embodiment of a data transmission method according to the present disclosure.

Optionally, referring to FIG. 5, the method further includes the following operations.

S501: A terminal device determines a status of a shared resource, where the status includes an active state and an inactive state.

When the status of the shared resource is the active state, the terminal device receives resource configuration information and performs operation S302.

Similar to the scenario, described in the embodiment in FIG. 3, in which the first radio access network device and the second radio access network device share a shared resource in a time division manner and/or a frequency division manner, a first radio access network device and a second radio access network device have respective statuses on the shared resource. For example, a status of the shared resource of the first radio access network device includes an active state and an inactive state. If the status of the shared resource of the first radio access network device is the active state, a terminal device served by the first radio access network device receives downlink information or sends uplink information on the shared resource. When receiving the downlink information or sending the uplink information on the shared resource, the terminal device needs to determine a resource occupied by the second radio access network device in shared resources, to determine a resource available to the terminal device. To be specific, the terminal device needs to receive, in a target time unit based on the resource configuration information, the downlink information sent by the first radio access network device by using a first resource in the shared resources, or send the uplink information to the first radio access network device in a target time unit based on the resource configuration information by using a second resource in the shared resources. A specific method is the same as that in operation S302, and details are not described herein again.

S502: When the status of the shared resource is the inactive state, the terminal device skips receiving the resource configuration information, the terminal device skips receiving downlink information by using a first resource, or the terminal device skips sending uplink information by using a second resource, where the first resource and the second resource are resources in the shared resources except an occupied resource indicated by the resource configuration information, the downlink information includes downlink control information and/or downlink service information, and the uplink information includes uplink control information and/or uplink service information.

Optionally, when the status of the shared resource is the inactive state, the terminal device receives a discovery reference signal sent by the first radio access network device on a third resource in the shared resources. Optionally, the discovery reference signal sent by the first radio access network device on the third resource in the shared resources is used for related measurement of radio resource management (RRM) of the terminal device, and the like.

Optionally, the terminal device needs to determine the third resource based on the resource configuration information in operation S301.

Figure 6:
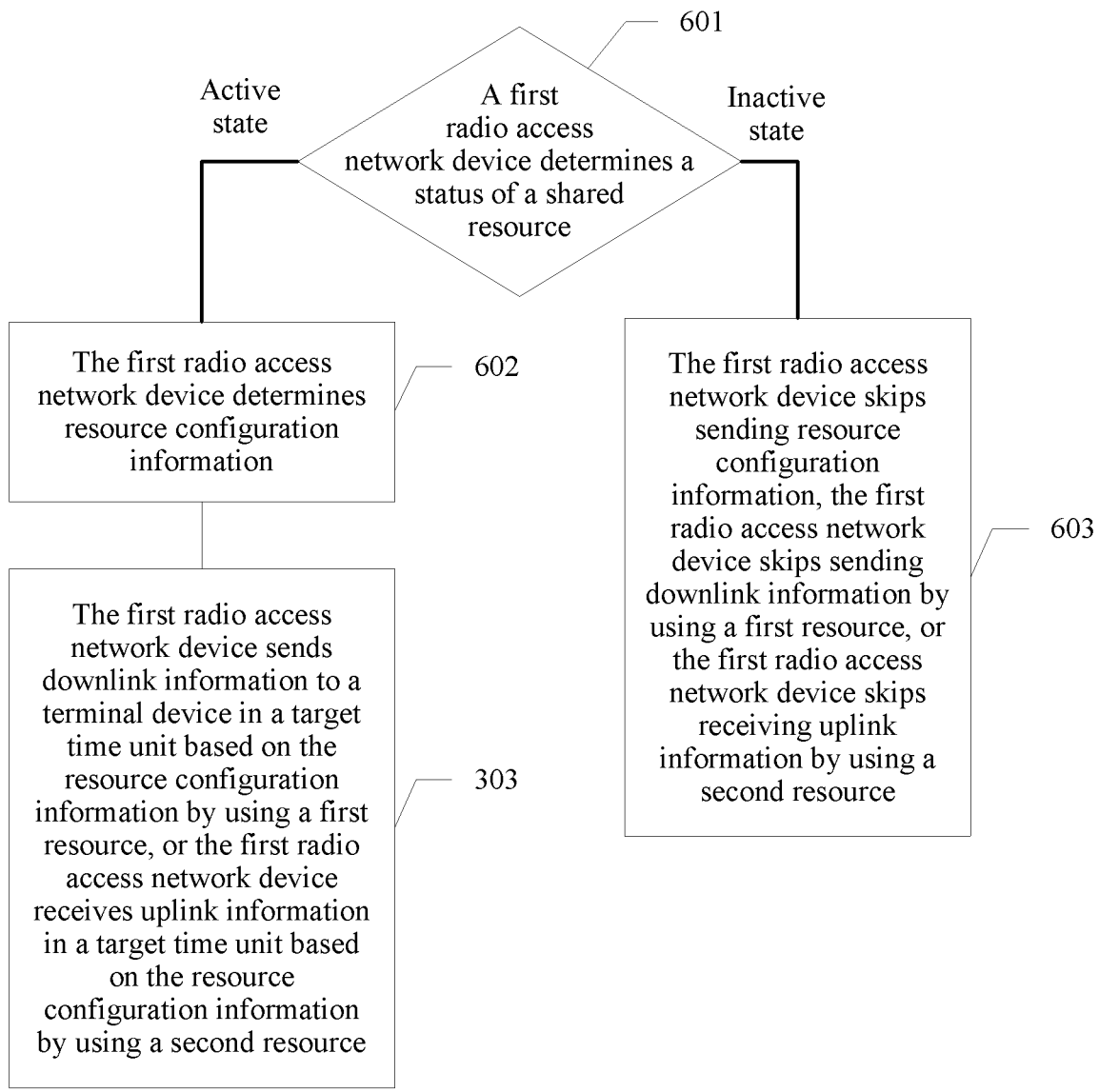
FIG. 6 is a schematic flowchart of another embodiment of a data transmission method according to the present disclosure.

Optionally, referring to FIG. 6, the method further includes the following operations.

S601: A first radio access network device determines a status of a shared resource, where the status includes an active state and an inactive state.

When the status of the shared resource is the active state, the first radio access network device determines resource configuration information and performs operation S303 in the foregoing embodiment.

Similar to descriptions in the foregoing embodiment, the first radio access network device and the second radio access network device have respective statuses on the shared resource. For definitions and determining methods of the status of the shared resource and the resource configuration information, refer to related descriptions in the foregoing embodiment.

S602: When the status of the shared resource is the inactive state, the first radio access network device skips sending the resource configuration information, the first radio access network device skips sending downlink information by using a first resource, or the first radio access network device skips receiving uplink information by using a second resource, where the first resource and the second resource are resources in shared resources except an occupied resource indicated by the resource configuration information, the downlink information includes downlink control information and/or downlink service information, and the uplink information includes uplink control information and/or uplink service information.

Optionally, the method further includes: sending, by the first radio access network device, a discovery reference signal on a third resource in the shared resources. Optionally, the discovery reference signal sent by the first radio access network device on the third resource in the shared resources is used for related measurement of radio resource management (RRM) of a terminal device, and the like. Optionally, the first radio access network device determines the third resource based on the resource configuration information. The third resource is a resource in the shared resources except the occupied resource indicated by the resource configuration information.

In this embodiment, the first radio access network device indicates, to a terminal device served by the first radio access network device, resource occupation states corresponding to different states of the second access network device on the shared resource. The terminal device may determine an available resource in a shared carrier based on a resource occupation state, and communicate with the first access network device by using the available resource. In this way, the first access network device can use the shared resource regardless of a status of the second access network device on the shared resource, so that different types of radio access network devices flexibly and efficiently coexist on the shared resource. This improves utilization of the shared resource.

The following describes signals included in the first signal set and the second signal set in the foregoing embodiment.

In a first case of the first signal set and the second signal set:

Optionally, the first signal set includes a cell-specific reference signal (CRS), and a resource occupied by the CRS in the first signal set is located in each second time unit in the first time set; and the second signal set includes a CRS, and a resource occupied by the CRS in the second signal set is located in some second time units in the first time set, or the second signal set does not include a CRS.

Figure 7:
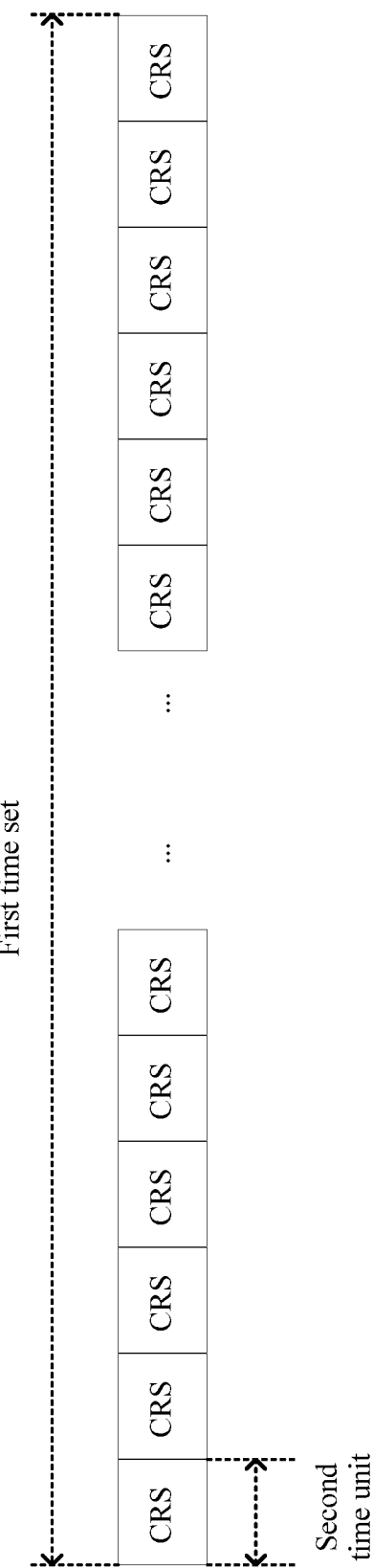
FIG. 7 is a schematic diagram of a location of a resource occupied by a CRS in a first signal set according to the present disclosure.

The first resource configuration information corresponds to the first state of the second radio access network device on the shared resource. It is assumed that the first state is a first cell on state. In this case, as shown in FIG. 7, information sent by the second radio access network device includes a CRS, and a resource occupied by the CRS is located in each second time unit in the first time set. The first time set is a time period in which the second radio access network device is in the first state on the shared resource.

If the resource configuration information that is obtained by the terminal device served by the first radio access network device is the first resource configuration information, the terminal device may determine that resources used by the second radio access network device in the shared resources include a resource occupied by a CRS in each second time unit, and may determine that when the terminal device communicates with the first radio access network device, resources available to the terminal device and the first radio access network device in the shared resources do not include these resources.

Figure 8:
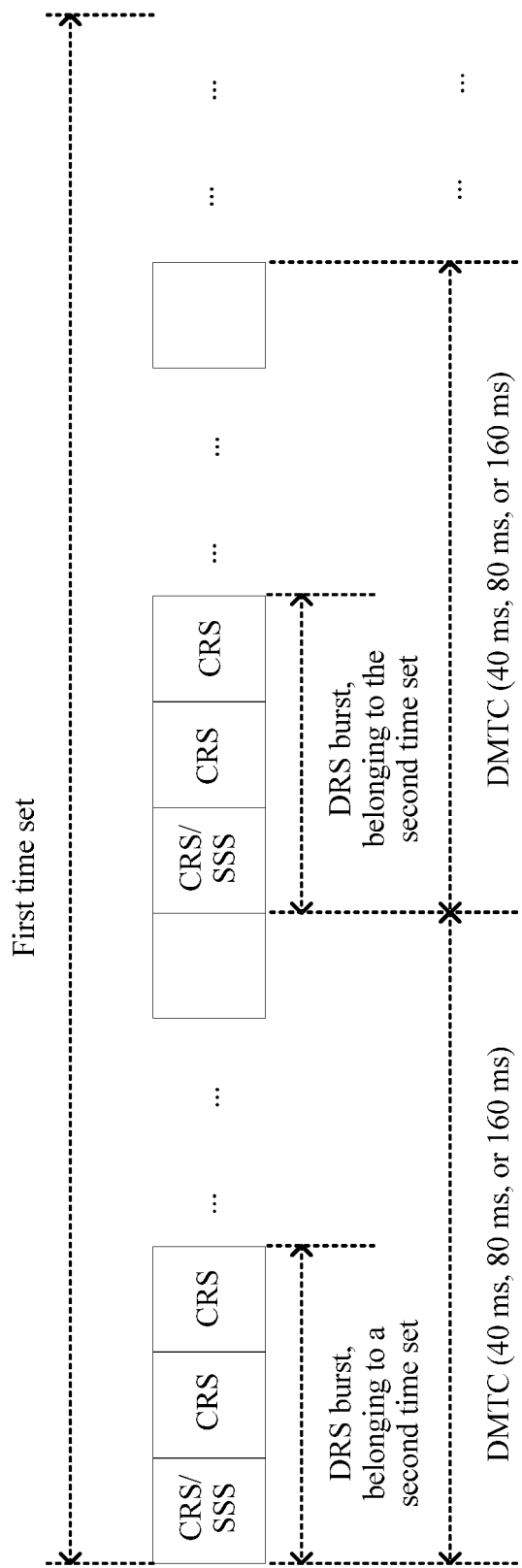
FIG. 8 is a schematic diagram of a location of a resource occupied by a CRS in a second signal set according to the present disclosure.

The second resource configuration information corresponds to the second state of the second radio access network device on the shared resource. It is assumed that the second state is a cell off state. In this case, information sent by the second radio access network device includes a DRS, and a resource occupied by the DRS information is located in a second time set. In the LTE system, the DRS is sent in a configured discovery signal measurement timing configuration (DMTC), and duration of the DMTC is 6 milliseconds. The DRS includes a PSS, an SSS, a CRS, and a configurable channel state information-reference signal (CSI-RS). A time range in which the DMTC includes DRS sending is usually referred to as a DRS burst. A length of one DRS burst may be configured as 1 ms to 5 ms for FDD, and 2 ms to 5 ms for TDD. The SSS needs to be located in the first subframe of a DRS burst. The CRS is located in each subframe of a DRS burst, and is sent only through a transmit port 0. For example, the second radio access network device is a radio access network device in the LTE system. The second time set corresponds to a DRS burst time period in the first time set. As shown in FIG. 8, a resource occupied by a CRS in the second signal set is located in some second time units in the first time set. For example, the second time units are second time units in DRS burst time periods included in the first time set.

The terminal device served by the first radio access network device learns that resources used by the second radio access network device in the shared resources are resources used by CRSs in some second time units included in the first time set, and then determines that resources that can be used by the terminal device in the shared resources do not include these resources.

It should be noted that the first time set may include a DRS burst time period, or may not include a DRS burst time period. If the first time set does not include a DRS burst time period, the second signal set does not include a CRS. Alternatively, the first radio access network device may perform a scheduling limitation, so that the first time set always does not include a DRS burst time period. In this case, the second signal set does not include a CRS.

In this way, if first indication information indicates that the resource configuration information is the first resource configuration information, the terminal device served by the first radio access network device may receive, in the target time unit, the downlink information sent by the first radio access network device on the first resource in the shared resources, or send the uplink information to the first radio access network device in the target time unit based on the resource configuration information by using the second resource in the shared resources. The first resource and the second resource are resources in the shared resources except the occupied resource indicated by the resource configuration information. The first resource is a resource in the shared resources except a CRS-occupied resource indicated by the first resource configuration information, and the second resource is a resource in the shared resources except a signal-occupied resource indicated by the first resource configuration information. If the first indication information indicates that the resource configuration information is the second resource configuration information, the terminal device served by the first radio access network device may receive, in the target time unit, the downlink information sent by the first radio access network device on the first resource in the shared resources, or send the uplink information to the first radio access network device in the target time unit based on the resource configuration information by using the second resource in the shared resources. The first resource is a resource in the shared resources except a CRS-occupied resource indicated by the second resource configuration information, and the second resource is a resource in the shared resources except a signal-occupied resource indicated by the second resource configuration.

For another example, the first resource configuration information includes a CRS port and information about a frequency offset during resource mapping. The second resource configuration information correspondingly does not include a CRS. If first indication information obtained by the terminal device served by the first radio access network device indicates that the resource configuration information is the first resource configuration information, the terminal device served by the first radio access network device may determine that the first resource is a resource in the shared resources except a resource occupied by a CRS of the second radio access network device in the target time unit, and the second resource is a resource in the shared resources except the resource occupied by the CRS of the second radio access network device in the target time unit. If first indication information obtained by the terminal device served by the first radio access network device indicates that the resource configuration information is the second resource configuration information, the terminal device served by the first radio access network device may determine that the first resource is irrelevant to a resource occupied by a CRS of the second radio access network device, and the second resource is irrelevant to the resource occupied by the CRS of the second radio access network device.

Optionally, in this embodiment, the first signal set includes at least one of a PSS, an SSS, and a PBCH in addition to the CRS; or the first signal set includes at least one of a PSS, an SSS, a PBCH, a PDCCH, a PHICH, and a PCFICH in addition to the CRS.

In this embodiment, it is assumed that the first signal set corresponds to the first on state of the second radio access network device, and signals sent by the second radio access network device in the first on state include a CRS, a PSS, an SSS, a PBCH, a PDCCH, a PHICH, a PCFICH, a PDSCH, and the like. If the first signal set corresponds to a second on state of the second radio access network device, signals sent by the second radio access network device in the first on state include a CRS, a PSS, an SSS, a PBCH, and the like. The PSS and the SSS in the first signal set are information sent by the second radio access network device on the shared resources based on a first period, a time length of the first period includes time lengths of N second time units, where N is a natural number. In other words, resources occupied by the PSS and the SSS in the first signal set meet the first period in time, the time length of the first period includes the time lengths of N second time units, where N is a natural number. A resource occupied by a PSS sent by a radio access network device in an frequency division duplex (FDD)

system in the LTE system is located in second time units whose sequence numbers are 0 and 5. A resource occupied by a PSS sent by a radio access network device in a time division duplex (TDD) system in the LTE system is located in second time units whose sequence numbers are 1 and 6. A resource occupied by an SSS sent by the radio access network device in the LTE system is located in the second time units whose sequence numbers are 0 and 5 in the first time set. A resource occupied by a physical broadcast channel (PBCH) sent by the radio access network device in the LTE system is located in a second time unit whose sequence number is 0 in the first time set. In other words, the PSS and the SSS in the first signal set are information sent by the second radio access network device on the shared resources based on a period of five second time units.

In this embodiment, it is assumed that the second signal set corresponds to the off state of the second radio access network device, and the PSS and the SSS in the second signal set are sent on the shared resources based on a second period, where duration of the second period includes duration of M second time units, and M is a natural number greater than N. In other words, a resource occupied by the PSS and the SSS in the first signal set meets the second period in time, the time length of the first period includes the time lengths of M second time units, and M is a natural number greater than N. DRS information sent by the second radio access network device is sent in a DRS burst of the configured DMTC. The DRS information includes a PSS and an SSS, and one DRS burst includes only one PSS or SSS. Therefore, a period for sending a DRS by the second radio access network device is the same as a DMTC period, and both are 40 ms, 80 ms, or 160 ms. It should be noted that the first time set may include a second time unit for sending a PSS or an SSS in a DRS burst, or may not include a second time unit for sending a PSS or an SSS in a DRS burst. If the first time set does not include a second time unit for sending a PSS or an SSS in a burst, the second signal set does not include a PSS or an SSS. Alternatively, the first radio access network device may limit scheduling, so that the first time set always does not include a second time unit for sending a PSS or an SSS in a DRS burst. In this case, the second signal set does not include a PSS or an SSS. If the first time set does not include a second time unit for sending a PBCH in a burst, the second signal set does not include a PBCH.

In a second case of the first signal set and the second signal set:

Optionally, the first signal set includes at least one of a PRACH, an SRS, and a PUCCH, and the second signal set is an empty set.

If the first resource configuration information corresponds to the first state of the second radio access network device on the shared resource, and the first state is a cell on state, the terminal device served by the second radio access network device may send information such as a PRACH, an SRS, or a PUCCH on the shared resource. If the first resource configuration information corresponds to the second state of the second radio access network device on the shared resource, and the second state is a cell off state, the terminal device served by the second radio access network device does not send information such as a PRACH, an SRS, or a PUCCH on the shared resource. If the resource configuration information is the first resource configuration information, a resource used for communication between the terminal device served by the first radio access network device and the first radio access network device is not a resource used to send the PRACH, the SRS, or the PUCCH. If the resource configuration information is the second resource configuration information, a resource used for communication between the terminal device served by the first radio access network device and the first radio access network device may be a resource used to send the PRACH, the SRS, or the PUCCH.

If a priority of occupying a shared resource by the second radio access network device is higher than that of occupying a shared resource by the first radio access network device, the first radio access network device needs to avoid using a resource used by the first radio access network device, to send the downlink information or receive the uplink information on the shared resource. In an embodiment, a communication resource of the first radio access network device in the shared resources is irrelevant to a resource occupied by at least one signal sent by the second radio access network device, for example, resources occupied by a PSS and an SSS that are sent by the second radio access network device. In this case, the first radio access network device only needs to instruct the terminal device to avoid using a resource that may conflict with the first radio access network device in a resource used by the second radio access network device, to send the downlink information or receive the uplink information on the shared resource. In other words, the first radio access network device only needs to notify the terminal device of the resource used by the second radio access network device except the resource used to send the PSS and the SSS.

Therefore, in addition to the CRS, the first signal set includes at least one of a PSS, an SSS, and a PBCH, or the first signal set includes at least one of a PSS, an SSS, a PBCH, a PDCCH, a PHICH, and a PCFICH. If the first signal set includes a PSS, a resource occupied by the PSS in the first signal set is located in second time units whose sequence numbers are 0 and 5 in the first time set, and this corresponds to a case in which the second radio access network device is a radio access network device in an FDD system. Alternatively, a resource occupied by the PSS in the first signal set is located in second time units whose sequence numbers are 1 and 6 in the first time set, and this corresponds to a case in which the second radio access network device is a radio access network device in a TDD system. If the first signal set includes a PSS, a resource occupied by the SSS in the first signal set is located in the second time units whose sequence numbers are 0 and 5 in the first time set. If the first signal set includes a PBCH, a resource occupied by the PBCH in the first signal set is located in a second time unit whose sequence number is 0 in the first time set.

Further, optionally, the first resource configuration information further includes MBSFN configuration information, and the MBSFN configuration information corresponds to an MBSFN configuration of the second radio access network device. The second resource configuration information does not include an MBSFN configuration. The LTE system supports a normal subframe used to send unicast information to a single terminal device, and an MBSFN subframe used to send broadcast information to a plurality of terminal devices. The unicast information may include data, control information, a reference signal, and/or other transmission to a specific single terminal device. The broadcast information may include data, control information, a reference signal, and/or other transmission to the plurality of terminal devices. Each MBSFN subframe is divided into a non-MBSFN domain and an MBSFN domain. The non-MBSFN domain occupies the first OFDM symbol or the first two OFDM symbols in the MBSFN subframe. An OFDM symbol that is not used by the MBSFN domain in the MBSFN subframe is the MBSFN domain. In the MBSFN subframe, the terminal device considers that there is no downlink scheduling data specific to the subframe, but may obtain other control information from the non-MBSFN domain in the MBSFN. In an MBSFN subframe of the second radio access network device, the second radio access network device sends the CRS only in a non-MBSFN domain. If the terminal device served by the first radio access network device determines that the resource configuration information is the first resource configuration information, the resource used for communication between the terminal device and the first access network device depends on an MBSFN subframe configuration of the second radio access network device. For example, when the target time unit is a time period in an MBSFN subframe of the second radio access network device, the resource used for communication between the terminal device and the first access network device does not include a CRS in a non-MBSFN domain of the MBSFN subframe, so that a CRS in an MBSFN domain of the MBSFN subframe does not need to be considered.

Optionally, it may be learned, by receiving first indication information sent by the first radio access network device, that the resource configuration information is the first resource configuration information or the second resource configuration information. Optionally, it may be learned, by receiving first indication information sent by the first radio access network device, that the resource configuration information is one of R types of resource configuration information, where R is an integer greater than or equal to 2. A $J^{th}$ type of resource configuration information in the R types of resource configuration information includes information about a resource occupied by a signal in a $J^{th}$ resource configuration signal set. Each of the R types of resource configuration information corresponds to a signal set of the second radio access network device. J is less than or equal to R. The R types of resource configuration information correspond to R states of the second radio access network device on the shared resource. Optionally, the R types of resource configuration information include the first resource configuration information and the second resource configuration information.

The following describes a method in which the first radio access network device sends the resource configuration information to the terminal device, and the terminal device receives the resource configuration information in the foregoing embodiment.

Optionally, the first radio access network device sends first indication information to the terminal device, where the first indication information is used to indicate that the resource configuration information is the first resource configuration information or the second resource configuration information. The terminal device obtains the resource configuration information by receiving the first indication information. Optionally, the first radio access network device sends first indication information to the terminal device, where the first indication information is used to indicate that the resource configuration information is one of R types of resource configuration information, where R is an integer greater than or equal to 2. The terminal device obtains the resource configuration information by receiving the first indication information.

The resource configuration information indicated by the first indication information corresponds to the status of the second radio access network device on the shared resource, and the status of the second radio access network device on the shared resource is notified, by using a MAC CE, to the terminal device served by the second radio access network device. Therefore, a time from transmission of the first indication information to an effective time of the information cannot be later than a sending time of the MAC CE. Therefore, optionally, the first indication information is information included in a MAC CE sent by the first radio access network device. Optionally, the first indication information may be physical downlink control information sent by the first radio access network device. The physical downlink control information includes physical broadcast downlink control information or physical unicast downlink control information. The terminal device served by the first access network may determine the resource configuration information by obtaining the first indication information. If the first indication information is the information included in the MAC CE or the physical downlink broadcast information, the resource configuration information determined by the terminal device remains effective until the terminal device receives information that instructs to update the resource configuration information. Optionally, the first indication information is information sent by the first radio access network device on the shared resource, or the first indication information is information sent by the first radio access network device on a resource other than the shared resource. Preferably, if the first indication information is the physical unicast downlink control information, the first indication information is the information sent by the first radio access network device on the shared resource.

Further, in an evolved version of a system of the second radio access network device, the status of the second radio access network device on the shared resource may be notified, by using physical downlink control information, to the terminal device served by the second radio access network device. Because the resource configuration information indicated by the first indication information corresponds to the status of the second radio access network device on the shared resource, a time from transmission of the first indication information to an effective time of the information cannot be later than a sending time of the physical downlink control information. Therefore, corresponding to that the status of the second radio access network device on the shared resource is notified, by using physical downlink control information, to the terminal device served by the second radio access network device, the first indication information is physical downlink control information sent by the first radio access network device. The physical downlink control information includes physical broadcast downlink control information or physical unicast downlink control information. The terminal device served by the first access network may determine the resource configuration information by obtaining the first indication information. The resource configuration information determined by the terminal device remains effective until the terminal device receives information that instructs to update the resource configuration information. Optionally, the first indication information is information sent by the first radio access network device on the shared resource, or the first indication information is information sent by the first radio access network device on a resource other than the shared resource. Preferably, if the first indication information is the physical unicast downlink control information, the first indication information is the information sent by the first radio access network device on the shared resource.

The method further includes the following:

The terminal device served by the first radio access network device receives third indication information sent by the first radio access network device, and obtains content of the first resource configuration information and content of the second resource configuration information. The third indication information is information included in radio resource control (RRC) signaling sent by the first radio access network device. Optionally, the terminal device served by the first radio access network device receives third indication information sent by the first radio access network device, and obtains content of each of R types of resource configuration information. The third indication information is information included in RRC signaling sent by the first radio access network device. Optionally, the third indication information may be a MAC CE or other physical downlink control information sent by the first radio access network device. For example, the first resource configuration information includes information about a resource occupied by a signal in the first signal set. The first resource configuration information includes a CRS port and information about a frequency offset during resource mapping. The second signal set includes a CRS port, information about a frequency offset during resource mapping, a DMTC window, DRS burst configuration information, and the like.

The following describes a method in which the terminal device determines the status of the shared resource and the first radio access network device sends the status of the shared resource to the terminal device in the foregoing embodiment.

The terminal device served by the first radio access network device obtains the status of the shared resource by using second indication information. The first radio access network device sends the second indication information to the terminal device, where the second indication information is used to indicate the status of the shared resource. Optionally, the second indication information is information sent by the first radio access network device by using a MAC CE, or information sent by the first radio access network device by using a physical downlink control channel.

Optionally, the first indication information and the second indication information are carried in a same message. The message may indicate both the first indication information and the second indication information. For example, the same information is fourth indication information, and the fourth indication information is shown in Table 1. It should be noted that Table 1 is merely an example, and does not constitute any limitation on a form of the fourth indication information.

TABLE 1

| Fourth indication information | Status of a shared carrier |
|---|---|
| 00 | First indication information: The status of the first radio access network device on the shared resource is the active state.<br>Second indication information: The resource configuration information is the first resource configuration information. |
| 01 | First indication information: The status of the first radio access network device on the shared resource is the active state.<br>Second indication information: The resource configuration information is the second resource configuration information. |
| 10 | First indication information: The status of the first radio access network device on the shared resource is the inactive state. |
| 11 | Reserved |

The resource configuration information indicated by the first indication information corresponds to the status of the second radio access network device on the shared resource, and the status of the second radio access network device on the shared resource is notified, by using a MAC CE, to the terminal device served by the second radio access network device. Therefore, a time from transmission of the first indication information to an effective time of the information cannot be later than a sending time of the MAC CE. Optionally, the first indication information and the second indication information are carried in the same message, for example, the fourth indication information. The fourth indication information may be information sent by the first radio access network device by using a MAC CE, or information sent by the first radio access network device by using a physical downlink control channel.

Further, in an evolved version of a system of the second radio access network device, the status of the second radio access network device on the shared resource may be notified, by using physical downlink control information, to the terminal device served by the second radio access network device. Because the resource configuration information indicated by the first indication information corresponds to the status of the second radio access network device on the shared resource, a time from transmission of the first indication information to an effective time of the information cannot be later than a sending time of the physical downlink control information. Therefore, corresponding to that the status of the second radio access network device on the shared resource is notified, by using physical downlink control information, to the terminal device served by the second radio access network device, the fourth indication information is physical downlink control information sent by the first radio access network device.

Because the fourth indication information carries both the first indication information and the second indication information, a time from transmission of information carrying the fourth indication information to an effective time of the information should meet a requirement of either of the first indication information and the first indication information for an effective time.

In a period in which the status of the shared resource is the inactive state, the terminal device served by the first radio access network device may be in an off state in a period of time. If the first radio access network device indicates, in this period by using the second indication information, that the status of the shared resource is the active state, the terminal device served by the first radio access network device needs to complete processes, such as radio frequency link connection, precise synchronization with the first access network device, and automatic gain adjustment before the second indication information takes effect. Likewise, in a period in which the status of the shared resource is the active state, the first radio access network device instructs the terminal device served by the first radio access network device to deactivate a shared carrier. Before the activation signaling takes effect, the terminal device needs to complete processes such as deactivation signaling demodulation and radio frequency link disconnection. In addition, the terminal device served by the first radio access network device obtains the resource configuration information by using the first indication information. The first indication information is related only to the status of the shared resource of the second radio access network device. After the first indication information is received and before the first indication information takes effect, the terminal device does not need to perform processes such as radio frequency link connection or disconnection, precise synchronization, and automatic gain adjustment. Therefore, a maximum value of duration of a time period from a moment at which the terminal device served by the first radio access network device receives the first indication information to a moment at which the resource configuration information indicated by the first indication information takes effect is less than a first threshold. The first threshold is a maximum value of duration of a time period from a moment at which the terminal device receives the second indication information to a moment at which the status that is of the shared resource and that is indicated by the second indication information takes effect. Alternatively, the terminal device served by the first radio access network device obtains the resource configuration information at a first time, where a time period between a start point of the first time set in which the resource configuration information takes effect and the first time is less than a second threshold. The second threshold is a maximum value of duration of a time period from a moment at which the second radio access network device sends a cell activation command to a moment at which the cell activation command takes effect. Optionally, the second threshold is 24 ms or 34 ms.

Corresponding to the foregoing method, the present disclosure provides a terminal device. The terminal device may be applied to a scenario in which a first radio access network device and a second radio access network device share a resource in a time division manner and/or a frequency division manner, and the terminal device may perform the operations in the foregoing method embodiment.

Figure 9:
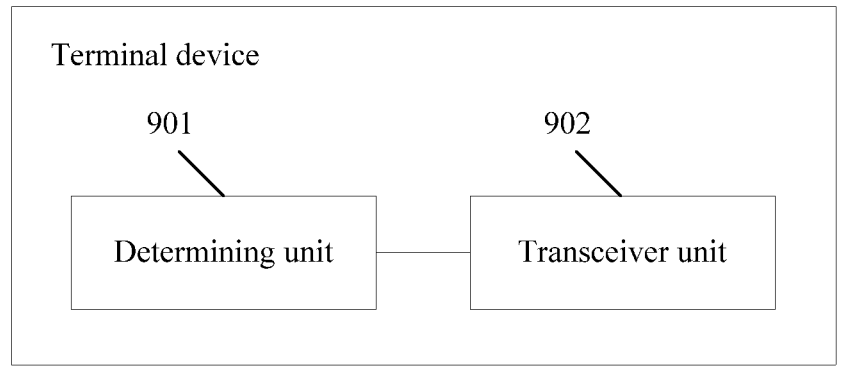
FIG. 9 is a schematic structural diagram of an embodiment of a terminal device according to the present disclosure.

Referring to FIG. 9, in an embodiment, the terminal device includes:

a determining unit 901, configured to determine a status of a shared resource, where the status includes an active state and an inactive state; and a transceiver unit 902, configured to receive resource configuration information when the status of the shared resource is the active state, where the resource configuration information is first resource configuration information or second resource configuration information, the first resource configuration information includes information about a resource occupied by a signal in a first signal set, the second resource configuration information includes information about a resource occupied by a signal in a second signal set, and the first signal set and the second signal set each correspond to a signal set of a second radio access network device.

The determining unit 901 is further configured to determine a first resource or a second resource from shared resources based on the resource configuration information, where the first resource and the second resource are resources in the shared resources except an occupied resource indicated by the resource configuration information.

The transceiver unit 902 is further configured to: receive, in a target time unit, downlink information sent by a first radio access network device by using the first resource, or send uplink information to a first radio access network device in a target time unit by using the second resource.

A type of the first radio access network device is different from a type of the second radio access network device, the terminal device is a terminal device served by the first radio access network device, and the target time unit is any one of at least one first time unit included in a first time set.

Optionally, when the status of the shared resource is the inactive state, the transceiver unit skips receiving the resource configuration information, the transceiver unit skips receiving downlink information by using a first resource, or the transceiver unit skips sending uplink information by using a second resource, where the first resource and the second resource are resources in shared resources except an occupied resource indicated by the resource configuration information, the downlink information includes downlink control information and downlink service information, and the uplink information includes uplink control information and uplink service information. Optionally, the transceiver unit is further configured to receive a discovery reference signal sent by the first radio access network device on a third resource in the shared resources.

For signals included in the first signal set and the second signal set in this embodiment, refer to related descriptions in the method embodiment.

For definitions and obtaining manners of the resource configuration information, the first resource configuration information, the second resource configuration information, and the status of the shared resource in this embodiment, refer to related descriptions in the method embodiment.

Optionally, the transceiver unit 902 is configured to receive first indication information, where the first indication information is used to indicate that the resource configuration information is the first resource configuration information or the second resource configuration information.

Optionally, the transceiver unit 902 is configured to receive second indication information, where the second indication information is used to indicate the status of the shared resource; and the determining unit is configured to determine the status of the shared resource by using the second indication information.

Optionally, the first indication information and the second indication information are carried in a same message.

Optionally, a maximum value of duration of a time period from a moment at which the terminal device receives the first indication information to a moment at which the resource configuration information indicated by the first indication information takes effect is less than a first threshold. The first threshold is a maximum value of duration of a time period from a moment at which the terminal device receives the second indication information to a moment at which the status that is of the shared resource and that is indicated by the second indication information takes effect.

Optionally, the transceiver unit is further configured to receive third indication information, where the third indication information is used to indicate the first resource configuration information and/or the second resource configuration information.

Optionally, the first indication information includes a MAC CE or physical downlink control information; the second indication information includes a MAC CE; or the third indication information includes RRC signaling.

For definitions and obtaining manners of the first indication information, the second indication information, and the third indication information in this embodiment, refer to related descriptions in the method embodiment.

Figure 10:
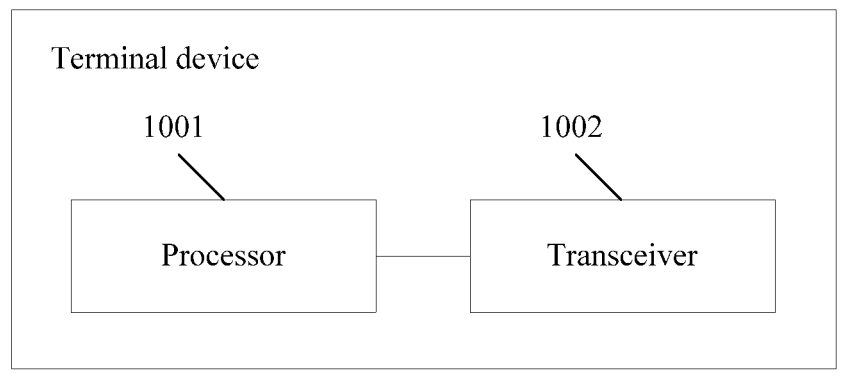
FIG. 10 is a schematic structural diagram of another embodiment of a terminal device according to the present disclosure.

Referring to FIG. 10, hardware elements of the terminal device include:

a processor 1001, configured to determine a status of a shared resource, where the status includes an active state and an inactive state; and a transceiver 1002, configured to receive resource configuration information when the status of the shared resource is the active state, where the resource configuration information is first resource configuration information or second resource configuration information, the first resource configuration information includes information about a resource occupied by a signal in a first signal set, the second resource configuration information includes information about a resource occupied by a signal in a second signal set, and the first signal set and the second signal set each correspond to a signal set of a second radio access network device.

The processor 1001 is further configured to determine a first resource or a second resource from shared resources based on the resource configuration information, where the first resource and the second resource are resources in the shared resources except an occupied resource indicated by the resource configuration information.

The transceiver 1002 is further configured to: receive, in a target time unit, downlink information sent by a first radio access network device by using the first resource, or send uplink information to a first radio access network device in a target time unit by using the second resource.

A type of the first radio access network device is different from a type of the second radio access network device, the terminal device is a terminal device served by the first radio access network device, and the target time unit is any one of at least one first time unit included in a first time set.

Further, the transceiver 1002 may be alternatively a transmitter and a receiver as an entity, which are respectively configured to perform a sending function and a receiving function.

Optionally, when the status of the shared resource is the inactive state, the transceiver 1002 skips receiving the resource configuration information, the transceiver 1002 skips receiving downlink information by using a first resource, or the transceiver 1002 skips sending uplink information by using a second resource, where the first resource and the second resource are resources in shared resources except an occupied resource indicated by the resource configuration information, the downlink information includes downlink control information and downlink service information, and the uplink information includes uplink control information and uplink service information. Optionally, the transceiver 1002 is further configured to receive a discovery reference signal sent by the first radio access network device on a third resource in the shared resources.

For signals included in the first signal set and the second signal set in this embodiment, refer to related descriptions in the method embodiment.

For definitions and sending manners of the resource configuration information, the first resource configuration information, the second resource configuration information, and the status of the shared resource in this embodiment, refer to related descriptions in the method embodiment.

Optionally, the transceiver 1002 is configured to receive first indication information, where the first indication information is used to indicate that the resource configuration information is the first resource configuration information or the second resource configuration information.

Optionally, the transceiver 1002 is configured to receive second indication information, where the second indication information is used to indicate the status of the shared resource; and the processor 1001 is configured to determine the status of the shared resource by using the second indication information.

Optionally, the first indication information and the second indication information are carried in a same message.

Optionally, a maximum value of duration of a time period from a moment at which the terminal device receives the first indication information to a moment at which the resource configuration information indicated by the first indication information takes effect is less than a first threshold. The first threshold is a maximum value of duration of a time period from a moment at which the terminal device receives the second indication information to a moment at which the status that is of the shared resource and that is indicated by the second indication information takes effect.

Optionally, the transceiver 1002 is further configured to receive third indication information, where the third indication information is used to indicate the first resource configuration information and/or the second resource configuration information.

Optionally, the first indication information includes a MAC CE or physical downlink control information; the second indication information includes a MAC CE; or the third indication information includes RRC signaling.

For definitions and obtaining manners of the first indication information, the second indication information, and the third indication information in this embodiment, refer to related descriptions in the method embodiment.

Corresponding to the foregoing method, the present disclosure provides a first radio access network device. The first radio access network device may be applied to a scenario in which the first radio access network device and a second radio access network device share a resource in a time division manner and/or a frequency division manner, and the terminal device may perform the operations in the foregoing method embodiment.

Figure 11:
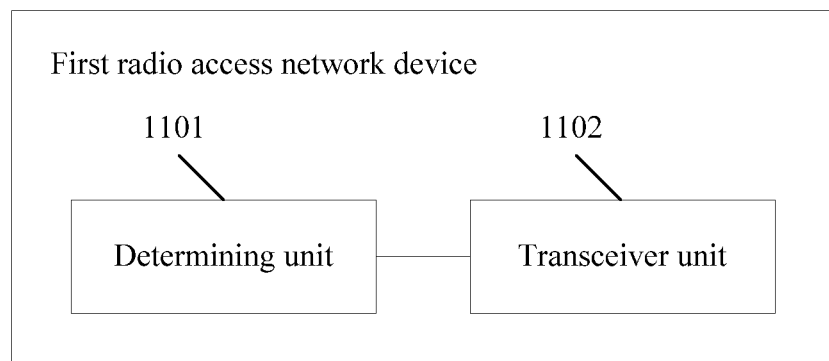
FIG. 11 is a schematic structural diagram of an embodiment of a radio access network device according to the present disclosure.

Referring to FIG. 11, in an embodiment, the first radio access network device includes a determining unit 1101 and a transceiver unit 1102.

The determining unit 1101 is configured to: determine a status of a shared resource, where the status includes an active state and an inactive state; and determine resource configuration information when the status of the shared resource is the active state, where the resource configuration information is first resource configuration information or second resource configuration information, the first resource configuration information includes information about a resource occupied by a signal in a first signal set, the second resource configuration information includes information about a resource occupied by a signal in a second signal set, and the first signal set and the second signal set each correspond to a signal set of a second radio access network device.

The determining unit 1101 is further configured to determine a first resource or a second resource from shared resources based on the resource configuration information, where the first resource and the second resource are resources in the shared resources except an occupied resource indicated by the resource configuration information.

The transceiver unit 1102 is configured to: send downlink information to a terminal device in a target time unit by using the first resource, or receive, in a target time unit by using the second resource, uplink information sent by a terminal device.

A type of the first radio access network device is different from a type of the second radio access network device, the terminal device is a terminal device served by the first radio access network device, and the target time unit is any one of at least one first time unit included in a first time set.

Optionally, when the status of the shared resource is the inactive state, the transceiver unit 1102 skips receiving the resource configuration information, the transceiver unit 1102 skips receiving downlink information by using a first resource, or the transceiver unit 1102 skips sending uplink information by using a second resource, where the first resource and the second resource are resources in shared resources except an occupied resource indicated by the resource configuration information, the downlink information includes downlink control information and/or downlink service information, and the uplink information includes uplink control information and/or uplink service information. Optionally, the transceiver unit 1102 is further configured to send a discovery reference signal on a third resource in the shared resources.

Optionally, the transceiver unit 1102 is further configured to send first indication information to the terminal device, where the first indication information is used to indicate that the resource configuration information is the first resource configuration information or the second resource configuration information.

Optionally, the transceiver unit 1102 is further configured to send second indication information to the terminal device, where the second indication information is used to indicate the status of the shared resource.

Optionally, the first indication information and the second indication information are carried in a same message.

Optionally, the transceiver unit 1102 is further configured to send third indication information, where the third indication information is used to indicate the first resource configuration information and/or the second resource configuration information.

Optionally, the first indication information includes a MAC CE or physical downlink control information; the second indication information includes a MAC CE; or the third indication information includes RRC signaling.

Figure 12:
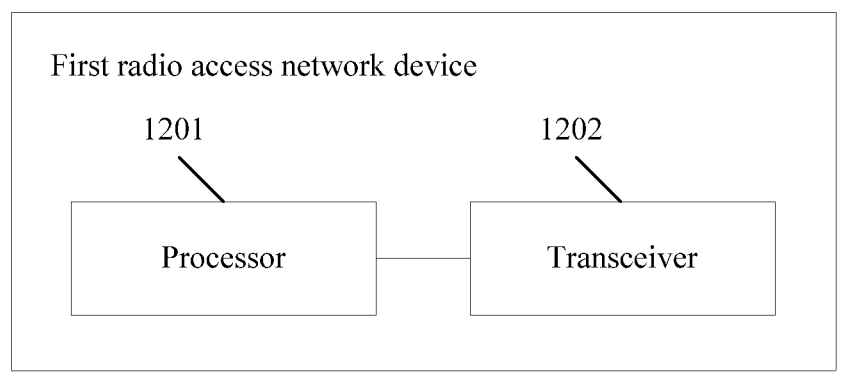
FIG. 12 is a schematic structural diagram of another embodiment of a radio access network device according to the present disclosure.

Referring to FIG. 12, hardware elements of the first radio access network device include a processor 1201 and a transceiver 1202.

The processor 1201 is configured to: determine a status of a shared resource, where the status includes an active state and an inactive state; and determine resource configuration information when the status of the shared resource is the active state, where the resource configuration information is first resource configuration information or second resource configuration information, the first resource configuration information includes information about a resource occupied by a signal in a first signal set, the second resource configuration information includes information about a resource occupied by a signal in a second signal set, and the first signal set and the second signal set each correspond to a signal set of a second radio access network device.

The processor 1201 is further configured to determine a first resource or a second resource from shared resources based on the resource configuration information, where the first resource and the second resource are resources in the shared resources except an occupied resource indicated by the resource configuration information.

The transceiver 1202 is configured to: send downlink information to a terminal device in a target time unit by using the first resource, or receive, in a target time unit by using the second resource, uplink information sent by a terminal device.

A type of the first radio access network device is different from a type of the second radio access network device, the terminal device is a terminal device served by the first radio access network device, and the target time unit is any one of at least one first time unit included in a first time set.

Further, the transceiver 1002 may be alternatively a transmitter and a receiver as an entity, which are respectively configured to perform a sending function and a receiving function.

Optionally, when the status of the shared resource is the inactive state, the transceiver 1002 skips receiving the resource configuration information, the transceiver 1002 skips receiving downlink information by using a first resource, or the transceiver 1002 skips sending uplink information by using a second resource, where the first resource and the second resource are resources in shared resources except an occupied resource indicated by the resource configuration information, the downlink information includes downlink control information and/or downlink service information, and the uplink information includes uplink control information and/or uplink service information. Optionally, the transceiver 1002 is further configured to send a discovery reference signal on a third resource in the shared resources.

For signals included in the first signal set and the second signal set in this embodiment, refer to related descriptions in the method embodiment.

For definitions and sending manners of the resource configuration information, the first resource configuration information, the second resource configuration information, and the status of the shared resource in this embodiment, refer to related descriptions in the method embodiment.

Optionally, the transceiver 1002 is further configured to send first indication information to the terminal device, where the first indication information is used to indicate that the resource configuration information is the first resource configuration information or the second resource configuration information.

Optionally, the transceiver 1002 is further configured to send second indication information to the terminal device, where the second indication information is used to indicate the status of the shared resource.

Optionally, the first indication information and the second indication information are carried in a same message.

Optionally, the transceiver 1002 is further configured to send third indication information, where the third indication information is used to indicate the first resource configuration information and/or the second resource configuration information.

Optionally, the first indication information includes a MAC CE or physical downlink control information; the second indication information includes a MAC CE; or the third indication information includes RRC signaling.

For definitions and obtaining manners of the first indication information, the second indication information, and the third indication information in this embodiment, refer to related descriptions in the method embodiment.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

What is claimed is:

1. An information transmission method, comprising:
determining, by a terminal device, a status of a shared resource, wherein the status comprises an active state and an inactive state;
receiving, by the terminal device, resource configuration information when the status of the shared resource is the active state, wherein the resource configuration information is first resource configuration information or second resource configuration information, the first resource configuration information comprises information about a resource occupied by a signal in a first signal set, the second resource configuration information comprises information about a resource occupied by a signal in a second signal set, and the first signal set and the second signal set each correspond to a signal set of a second radio access network device; and
receiving, by the terminal device in a target time unit based on the resource configuration information, downlink information sent by a first radio access network device by using a first resource, or sending, by the terminal device, uplink information to the first radio access network device in the target time unit based on the resource configuration information by using a second resource, wherein the first resource and the second resource respectively are resources in shared resources except an occupied resource indicated by the resource configuration information; wherein
a type of the first radio access network device is different from a type of the second radio access network device, the terminal device is a terminal device served by the first radio access network device, and the target time unit is any one of at least one first time unit comprised in a first time set.

2. The method according to claim 1, further comprising:
when the status of the shared resource is the inactive state, skipping receiving, by the terminal device, the resource configuration information, skipping receiving, by the terminal device, downlink information by using a first resource, or skipping sending, by the terminal device, uplink information by using a second resource, wherein the first resource and the second resource are resources in the shared resources except an occupied resource indicated by the resource configuration information, the downlink information comprises downlink control information and/or downlink service information, and the uplink information comprises uplink control information and/or uplink service information.

3. The method according to claim 2, further comprising:
receiving, by the terminal device, a discovery reference signal sent by the first radio access network device on a third resource in the shared resources.

4. The method according to claim 1, wherein
the first signal set comprises a first cell-specific reference signal (CRS), and a resource occupied by the first CRS in the first signal set is located in each second time unit in the first time set; and
the second signal set comprises a second CRS, and a resource occupied by the second CRS in the second signal set is located in some second time units in the first time set; or the second signal set does not comprise a CRS.

5. The method according to claim 1, wherein
the first signal set further comprises at least one of a primary synchronization signal (PSS), a secondary synchronization signal (SSS), and a physical broadcast channel (PBCH); or
the first signal set further comprises at least one of a PSS, an SSS, a PBCH, a physical downlink control channel (PDCCH), a physical hybrid automatic repeat request (HARD) indicatory channel (PHICH), and a physical control format indicator channel (PCFICH), wherein
the PSS and the SSS in the first signal set are information sent by the second radio access network device on the shared resources based on a first period, a time length of the first period comprises time lengths of N second time units, and N is a natural number.

6. The method according to claim 5, wherein
the second signal set further comprises at least one of a PSS and an SSS, the PSS and the SSS in the second signal set are sent on the shared resources based on a second period, duration of the second period comprises duration of M second time units, and M is a natural number greater than N.

7. The method according to claim 1, wherein
the first resource configuration information further comprises multi-broadcast single-frequency network (MBSFN) configuration information, and the MBSFN configuration information corresponds to an MBSFN configuration of the second radio access network device; and
the second resource configuration information does not comprise the MBSFN configuration information.

8. The method according to claim 1, wherein
the first signal set comprises at least one of a physical random access channel (PRACH), a sounding reference symbol (SRS), and a physical uplink control channel (PUCCH), and the second signal set is an empty set.

9. The method according to claim 1, wherein the receiving, by the terminal device, resource configuration information comprises:

receiving, by the terminal device, first indication information, wherein the first indication information is used to indicate that the resource configuration information is the first resource configuration information or the second resource configuration information, wherein the determining, by a terminal device, a status of a shared resource comprises:

receiving, by the terminal device, second indication information, wherein the second indication information is used to indicate the status of the shared resource, wherein the first indication information and the second indication information are carried in a same message; and determining, by the terminal device, the status of the shared resource by using the second indication information, wherein a maximum value of duration of a time period from a moment at which the terminal device receives the first indication information to a moment at which the resource configuration information indicated by the first indication information takes effect is less than a first threshold; and the first threshold is a maximum value of duration of a time period from a moment at which the terminal device receives the second indication information to a moment at which the status that is of the shared resource and that is indicated by the second indication information takes effect; and receiving, by the terminal device, third indication information, wherein the third indication information is used to indicate the first resource configuration information and the second resource configuration information, wherein the first indication information comprises a media access control layer control element (MAC CE) or physical downlink control information;

the second indication information comprises a MAC CE; or the third indication information comprises radio resource control (RRC) signaling.

10. A terminal device, comprising:

a processor, configured to determine a status of a shared resource, wherein the status comprises an active state and an inactive state; and a transceiver unit, configured to receive resource configuration information when the status of the shared resource is the active state, wherein the resource configuration information is first resource configuration information or second resource configuration information, the first resource configuration information comprises information about a resource occupied by a signal in a first signal set, the second resource configuration information comprises information about a resource occupied by a signal in a second signal set, and the first signal set and the second signal set each correspond to a signal set of a second radio access network device, wherein the processor is further configured to determine a first resource or a second resource from shared resources based on the resource configuration information, wherein the first resource and the second resource are resources in the shared resources except an occupied resource indicated by the resource configuration information; and the transceiver unit is further configured to: receive, in a target time unit, downlink information sent by a first radio access network device by using the first resource, or send uplink information to the first radio access network device in the target time unit by using the second resource, wherein a type of the first radio access network device is different from a type of the second radio access network device, the terminal device is a terminal device served by the first radio access network device, and the target time unit is any one of at least one first time unit comprised in a first time set.

11. The terminal device according to claim 10, wherein when the status of the shared resource is the inactive state, the transceiver unit skips receiving the resource configuration information, the transceiver unit skips receiving downlink information by using a first resource, or the transceiver unit skips sending uplink information by using a second resource, wherein the first resource and the second resource are resources in the shared resources except an occupied resource indicated by the resource configuration information, the downlink information comprises downlink control information and/or downlink service information, and the uplink information comprises uplink control information and/or uplink service information.

12. The terminal device according to claim 11, wherein the transceiver unit is further configured to receive a discovery reference signal sent by the first radio access network device on a third resource in the shared resources.

13. The terminal device according to claim 10, wherein the first signal set comprises a first cell-specific reference signal (CRS), and a resource occupied by the first CRS in the first signal set is located in each second time unit in the first time set; and the second signal set comprises a second CRS, and a resource occupied by the second CRS in the second signal set is located in some second time units in the first time set; or the second signal set does not comprise a CRS.

14. The terminal device according to claim 10, wherein the first signal set further comprises at least one of a primary synchronization signal (PSS), an secondary synchronization signal (SSS), and a physical broadcast channel (PBCH); or the first signal set further comprises at least one of a primary synchronization signal (PSS), an secondary synchronization signal (SSS), a physical broadcast channel (PBCH), a physical downlink control channel (PDCCH), a physical hybrid automatic repeat request (HARD) indicator channel (PHICH), and a physical control format indicator channel (PCFICH), wherein the PSS and the SSS in the first signal set are information sent by the second radio access network device on the shared resources based on a first period, a time length of the first period comprises time lengths of N second time units, and N is a natural number.

15. The terminal device according to claim 14, wherein the second signal set further comprises at least one of a PSS and an SSS, the PSS and the SSS in the second signal set are sent on the shared resources based on a second period, duration of the second period comprises duration of M second time units, and M is a natural number greater than N.

16. The terminal device according to claim 10, wherein the first resource configuration information further comprises multicast-broadcast single-frequency network (MBSFN) configuration information, and the MBSFN configuration information corresponds to an MBSFN configuration of the second radio access network device; and the second resource configuration information does not comprise the MBSFN configuration information.

17. The terminal device according to claim 10, wherein the first signal set comprises at least one of a physical random access channel (PRACH), a sounding reference signal (SRS), and a physical uplink control channel (PUCCH), and the second signal set is an empty set.

18. The terminal device according to claim 10, wherein the transceiver unit is configured to receive first indication information, wherein the first indication information is used to indicate that the resource configuration information is the first resource configuration information or the second resource configuration information, wherein the transceiver unit is configured to receive second indication information, wherein the second indication information is used to indicate the status of the shared resource; and the processor is configured to determine the status of the shared resource by using the second indication information, wherein the first indication information and the second indication information are carried in a same message, wherein a maximum value of duration of a time period time from a moment at which the terminal device receives the first indication information to a moment at which the resource configuration information indicated by the first indication information takes effect is less than a first threshold; and the first threshold is a maximum value of duration of a time period from a moment at which the terminal device receives the second indication information to a moment at which the status that is of the shared resource and that is indicated by the second indication information takes effect, wherein the transceiver unit is further configured to receive third indication information, wherein the third indication information is used to indicate the first resource configuration information and the second resource configuration information;

wherein the first indication information comprises a media access control layer control element (MAC CE) or physical downlink control information; and the second indication information comprises a MAC CE; or the third indication information comprises radio resource control (RRC) signaling.

19. A non-transitory computer-readable storage medium, comprising an instruction, wherein when the instruction runs on a computer, the computer performs operations comprising:

determining, by a terminal device, a status of a shared resource, wherein the status comprises an active state and an inactive state;

receiving, by the terminal device, resource configuration information when the status of the shared resource is the active state, wherein the resource configuration information is first resource configuration information or second resource configuration information, the first resource configuration information comprises information about a resource occupied by a signal in a first signal set, the second resource configuration information comprises information about a resource occupied by a signal in a second signal set, and the first signal set and the second signal set each correspond to a signal set of a second radio access network device; and receiving, by the terminal device in a target time unit based on the resource configuration information, downlink information sent by a first radio access network device by using a first resource, or sending, by the terminal device, uplink information to the first radio access network device in the target time unit based on the resource configuration information by using a second resource, wherein the first resource and the second resource respectively are resources in shared resources except an occupied resource indicated by the resource configuration information; wherein a type of the first radio access network device is different from a type of the second radio access network device, the terminal device is a terminal device served by the first radio access network device, and the target time unit is any one of at least one first time unit comprised in a first time set.

20. The non-transitory computer-readable storage medium of claim 19, the operations further comprising:

when the status of the shared resource is the inactive state, skipping receiving, by the terminal device, the resource configuration information, skipping receiving, by the terminal device, downlink information by using a first resource, or skipping sending, by the terminal device, uplink information by using a second resource, wherein the first resource and the second resource are resources in the shared resources except an occupied resource indicated by the resource configuration information, the downlink information comprises downlink control information and/or downlink service information, and the uplink information comprises uplink control information and/or uplink service information.

* * * * *